United States Patent
Gupta et al.

(10) Patent No.: US 12,475,740 B2
(45) Date of Patent: Nov. 18, 2025

(54) METHODS AND DEVICES FOR PRECLUDING PROCESSING OF BIOMETRIC SENSOR SAMPLES TO PREVENT FALSE SENSOR AUTHENTICATION

(71) Applicant: Motorola Mobility LLC, Chicago, IL (US)

(72) Inventors: Ranjeet Gupta, Hawthorn Woods, IL (US); Rakshit Khosla, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 386 days.

(21) Appl. No.: 18/121,934

(22) Filed: Mar. 15, 2023

(65) Prior Publication Data
US 2024/0312257 A1   Sep. 19, 2024

(51) Int. Cl.
*G06V 40/60* (2022.01)
*G06V 40/13* (2022.01)
*G06V 40/16* (2022.01)

(52) U.S. Cl.
CPC .............. *G06V 40/60* (2022.01); *G06V 40/13* (2022.01); *G06V 40/172* (2022.01)

(58) Field of Classification Search
CPC ....... G06V 40/60; G06V 40/13; G06V 40/172
See application file for complete search history.

(56) References Cited

U.S. PATENT DOCUMENTS

| | | |
|---|---|---|
| 8,660,978 B2 | 2/2014 | Hinckley |
| 9,977,505 B2 | 5/2018 | Balasubramanian |
| 9,983,656 B2 | 5/2018 | Merrell |
| 10,831,308 B2 | 11/2020 | Merrell |
| 10,977,351 B2 | 4/2021 | Alameh |
| 2015/0355716 A1* | 12/2015 | Balasubramanian ........................ G06F 3/04186 345/173 |
| 2016/0086010 A1 | 3/2016 | Merrell |
| 2020/0150816 A1* | 5/2020 | Merrell ................... G06F 3/016 |

OTHER PUBLICATIONS

Dong, David, "Build TA images on different TEE", Blog; Published Feb. 3, 2021; Available online at https://dqdongg.com/android/fingerprint/2021/02/03/Fingerprint-build-ta.html.

* cited by examiner

*Primary Examiner* — Wassim Mahrouka
(74) *Attorney, Agent, or Firm* — Philip H. Burrus, IV

(57) ABSTRACT

An electronic device includes a biometric sensor. One or more processors of the electronic device or a pre-processor of the biometric sensor detect actuation of the biometric sensor. The one or more processors or the pre-processor can then determine whether at least one predefined condition is occurring concurrently with actuation of the biometric sensor. Where it is, the one or more processors or pre-processor can preclude the biometric sensor from processing received biometric data samples while the predefined condition is occurring. Illustrating by example, the one or more processors or pre-processor can discard the biometric data samples while the biometric sensor remains operational.

20 Claims, 13 Drawing Sheets

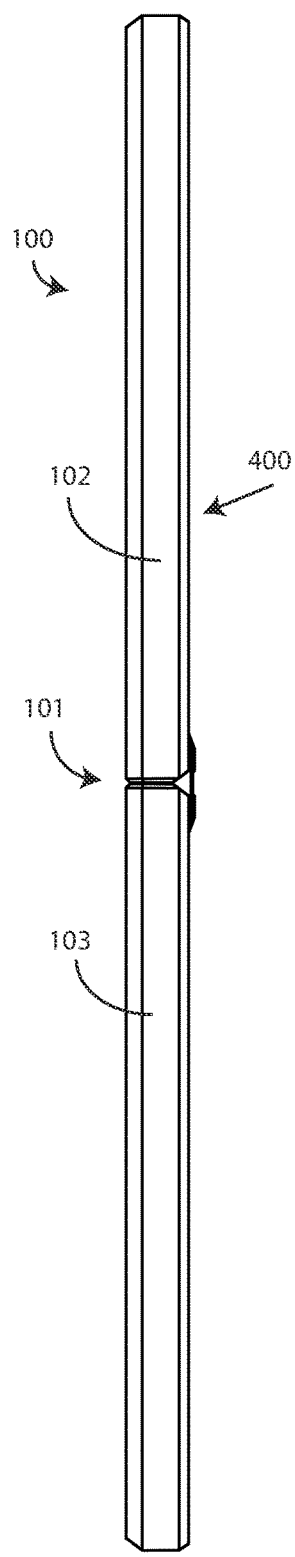
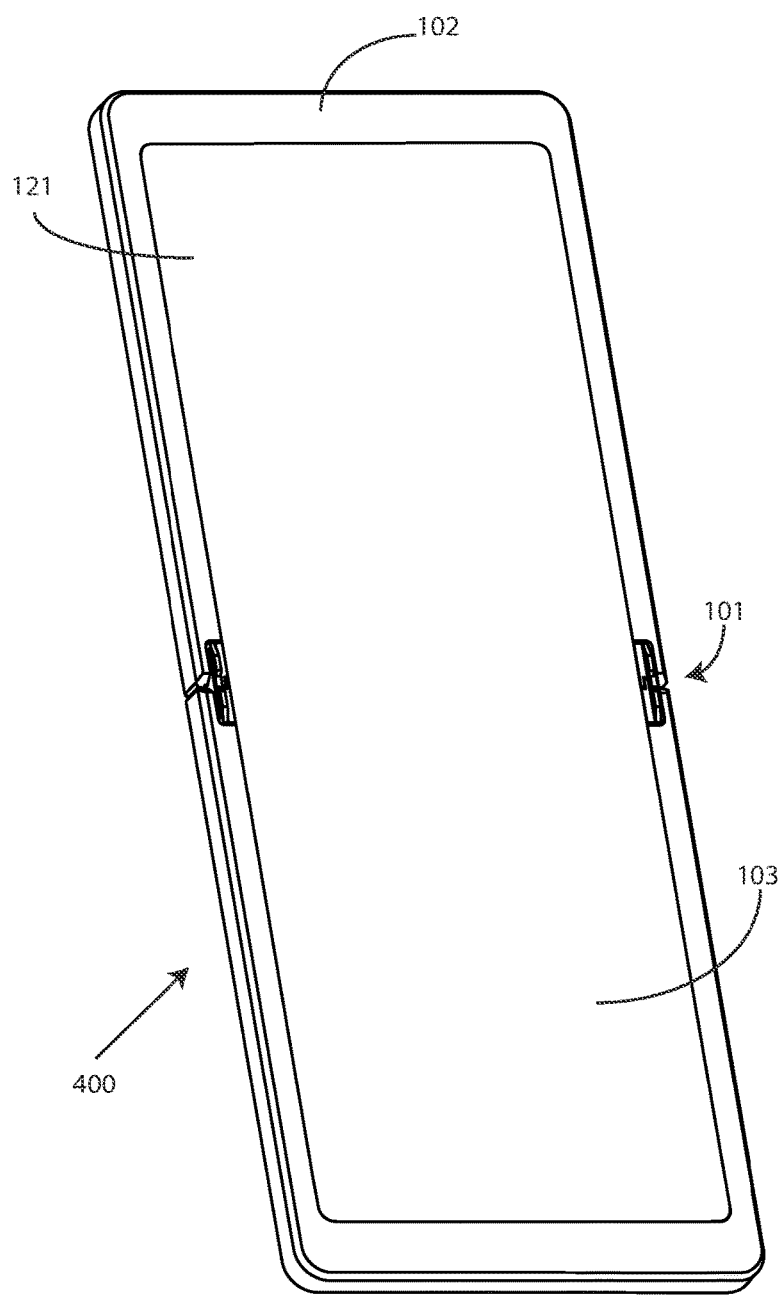
FIG. 4
FIG. 5

METHODS AND DEVICES FOR PRECLUDING PROCESSING OF BIOMETRIC SENSOR SAMPLES TO PREVENT FALSE SENSOR AUTHENTICATION

BACKGROUND

Technical Field

This disclosure relates generally to electronic devices, and more particularly to electronic devices comprising biometric sensors.

Background Art

Portable electronic devices, such as smartphones, are nearly ubiquitous today. Advances in processing power and display resolution result in the owners of such devices using the same for many different purposes including, but not limited to, voice communications, text messaging, Internet browsing, commerce such as banking, and social networking.

As these devices become more sophisticated, they can also become more complicated to operate. Designers are constantly working to find techniques to simplify user interfaces and operating systems to allow users to take advantage of the sophisticated features of a device without introducing complicated control operations. While these modern user interfaces generally simplify device operation, unintended device operation can still occur when imprecise user input is received. It would be advantageous to have improved methods and devices to make the use of these user interfaces more seamlessly perform in the manner intended by users.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIGS. 4-5 illustrate the electronic device of FIG. 1 in an axially displaced open position.

Figure 1:
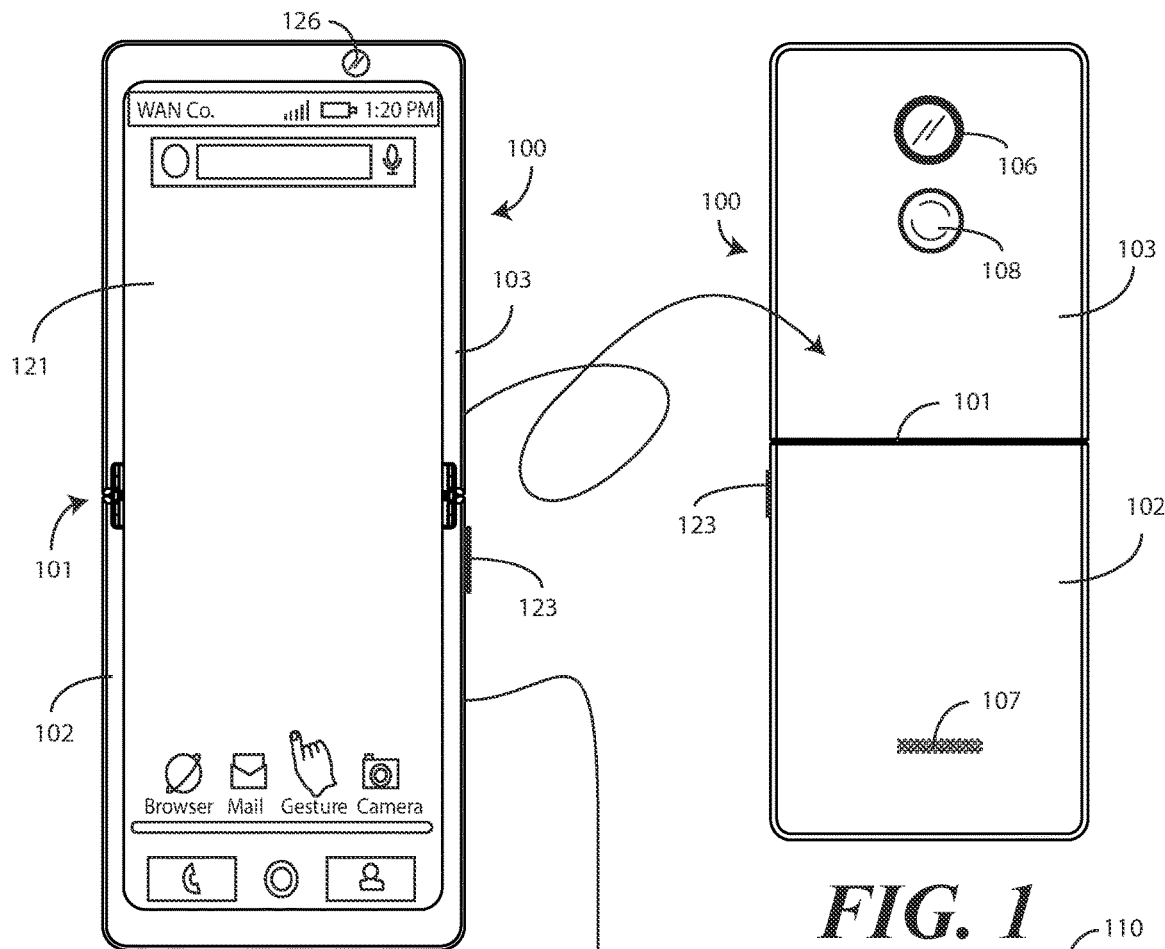
FIG. 1 illustrates one explanatory electronic device in accordance with one or more embodiments of the disclosure.
Figure 1:
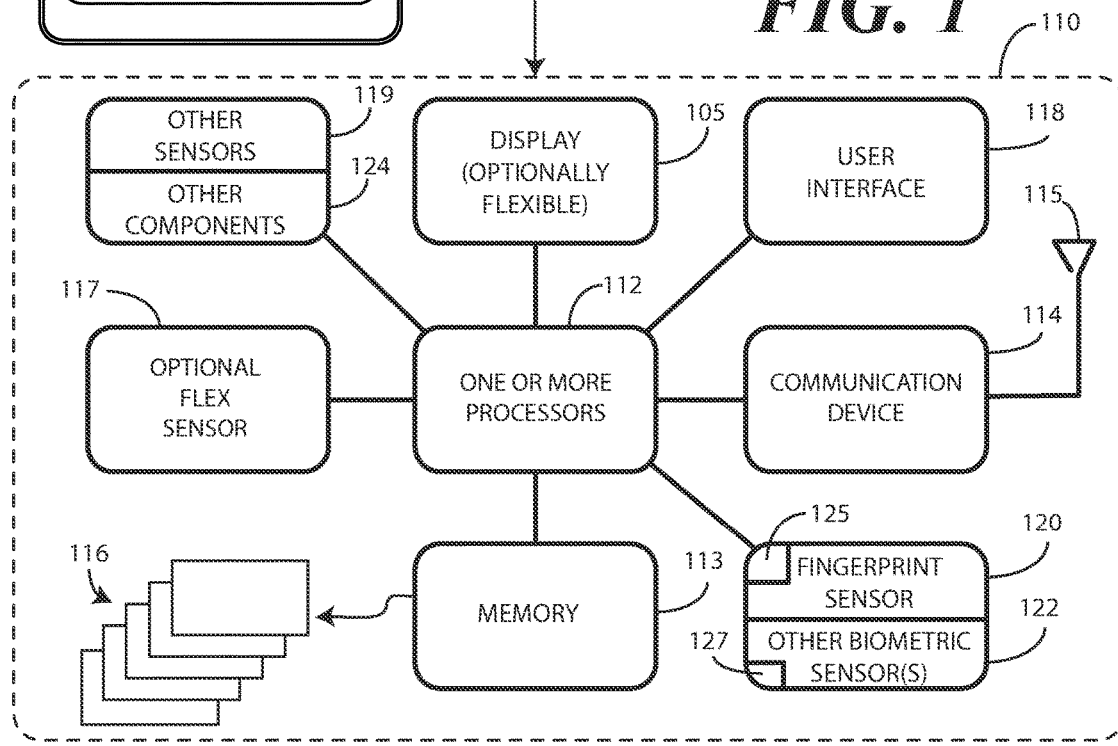

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, when at least one predefined condition is occurring concurrently with the actuation of a biometric sensor, precluding processing of biometric data samples while leaving a biometric sensor operational to prevent false authentication of the biometric data samples. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of precluding processing of at least some fingerprint sensor data samples by discarding those fingerprint sensor data samples received by a fingerprint sensor when the fingerprint sensor is actuated while at least one predefined condition is occurring in an electronic device. The non-processor circuits may include, but are not limited to, a radio receiver, a radio transmitter, signal drivers, clock circuits, power source circuits, and user input devices. As such, these functions may be interpreted as steps of a method to perform the discard of fingerprint sensor data samples to prevent false authentication of those fingerprint sensor data samples.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device having a biometric sensor, one example of which is a fingerprint sensor. In one or more embodiments, the biometric sensor includes a pre-processor that is capable of performing various functions, including detecting a finger touching the fingerprint sensor, capturing and storing fingerprint data from the finger, discarding fingerprint sensor data samples to prevent the fingerprint sensor from authenticating the same, authenticating a user by comparing captured fingerprint data to stored fingerprint data, and/or detecting user actions across a surface of the fingerprint sensor.

In one or more embodiments, the pre-processor of the blade substrate determines whether at least one predefined condition is occurring concurrently with the actuation of the biometric sensor. In one or more embodiments, to prevent false authentication, the pre-processor of the biometric sensor precludes processing of a plurality of biometric data samples received by the biometric sensor during the actuation of the biometric sensor in response to determining that the at least one predefined condition is occurring. In one or more embodiments, the pre-processor leaves the biometric sensor operational while this preclusion is in effect. Thus, while the biometric sensor is fully operational, in one or more embodiments the pre-processor simply discards biometric data samples when certain conditions occur to prevent false authentication of those biometric data samples.

As noted above, designers are constantly working to find techniques to simplify user interfaces and operating systems to allow users to take advantage of the sophisticated features of a device without introducing complicated control operations. Additionally, embodiments of the disclosure contemplate that there is a design trend toward providing devices with cleaner aesthetics, fewer parting or other manufacturing lines, and more smooth surfaces. As a result, biometric sensors such as fingerprint sensors are being placed in a variety of places along the surfaces of an electronic device to maintain these clean lines.

Illustrating by example, in one or more embodiments an electronic device is configured as a foldable electronic device with a first device housing that is pivotable about a hinge relative to a second device housing between and axially displaced open position and a closed position. In one or more embodiments, a fingerprint sensor is positioned on a minor surface of the first device housing. Illustrating by example, in one or more embodiments the fingerprint sensor is integrated into a power button put on the side of the first device housing.

When this occurs, embodiments of the disclosure contemplate that a user may inadvertently actuate the fingerprint sensor simply by holding the electronic device. For instance, when such a foldable device is held in a hand with the fingerprint sensor situated on the side, simply gripping the electronic device may cause the fingerprint sensor to receive data it presumes to be fingerprint data. In fact, anytime the skin of the hand touches the fingerprint sensor, the fingerprint sensor may attempt to authenticate whatever data it is receiving to determine if an authorized user is attempting to unlock the device. Embodiments of the disclosure contemplate that in most devices, when one too many "failed" authentication operations occur, a user must then input additional authentication information, such as a passcode or personal identification number (PIN), to unlock the device. This effectively renders the fingerprint sensor moot since the user is always required to enter a passcode or PIN, which lessens the user experience.

Embodiments of the disclosure provide a solution to this by, in certain conditions, discarding fingerprint sensor data samples to preclude the fingerprint sensor from attempting to authenticate them. In one or more embodiments, when an electronic device comprises a first device housing coupled to a second device housing by a hinge such that the first device housing is pivotable about the hinge relative to the second device housing between an axially displaced open position and a closed position, with a fingerprint sensor carried by one of the first device housing or second device housing, a pre-processor of the fingerprint sensor discards at least some fingerprint sensor data samples received by the fingerprint sensor when the fingerprint sensor is actuated while the a predefined condition is occurring.

The predefined condition can vary. In one or more embodiments, the predefined condition is simply the fact that the first device housing and the second device housing are pivoted to the closed position. Thus, in one or more embodiments the pre-processor discards at least some fingerprint sensor data samples received by the fingerprint sensor when the fingerprint sensor is actuated while the first device housing and second device housing are in the closed position.

Other predefined criterions can be combined with this "discard while closed" fingerprint sensor data samples preclusion is occurring. Embodiments of the disclosure contemplate that if a user touches a fingerprint sensor to quickly, the user likely did not intend to unlock the device using the fingerprint sensor. Similarly, if a user grips a fingerprint sensor for a very long time, it is likely the case that the user is simply holding the electronic device while inadvertently touching the fingerprint sensor. Accordingly, in one or more embodiments the pre-processor discards at least some fingerprint sensor data samples received by the fingerprint sensor when the fingerprint sensor is actuated while the first device housing and the second device housing are in the closed position and at least one other predefined condition is occurring, with that predefined condition comprising the fingerprint sensor receiving the fingerprint sensor data samples for either less than a predefined minimum fingerprint sensor actuation duration threshold or more than a predefined maximum fingerprint sensor actuation duration threshold.

Thus, in one or more embodiments if the electronic device is closed and a user touches the fingerprint sensor too quickly or holds the fingerprint sensor for too long the pre-processor discards at least some fingerprint sensor data samples to prevent false authentication. By contrast, the pre-processor can cause the fingerprint sensor data samples to be processed to authenticate a source of the fingerprint sensor data samples as an authorized user of the electronic device when the first device housing and second device housing are either pivoted to the axially displaced open position when the fingerprint sensor data samples are received or, alternatively, pivoted to the cp while the fingerprint sensor data samples are received during a duration that is between the predefined minimum fingerprint sensor actuation duration threshold and the predefined maximum fingerprint sensor actuation duration threshold.

In one or more embodiments, this fingerprint sensor processing preclusion via the discard of the fingerprint sensor data samples occurs while a primary processor of the electronic device is in a low-power or sleep mode. By using the pre-processor to discard the fingerprint sensor data samples when the predefined condition(s) are occurring, the main processor can be left in the low-power or sleep mode until the fingerprint sensor actually authenticates a source of the fingerprint sensor data samples as the authorized user of the electronic device. This saves power and extends run time of the electronic device.

In still other embodiments, the predefined condition is defined by motion of the electronic device. Embodiments of the disclosure contemplate that when a user intends to use a biometric sensor such as a fingerprint sensor to unlock an electronic device, they frequently hold the electronic device relatively still. It is rare that a user would attempt to use a fingerprint sensor to unlock an electronic device while swinging the electronic device wildly in three-dimensional space. They might not even be able to successfully put a finger on the fingerprint sensor when this is occurring! Accordingly, in one or more embodiments the pre-processor discards at least some fingerprint sensor data samples received by the fingerprint sensor when the fingerprint sensor is actuated while the first device housing and the second device housing are in the closed position and at least one other predefined condition is occurring, with that predefined condition comprising the motion of the electronic device in three-dimensional space exceeding a predefined maximum electronic device motion threshold.

In one or more embodiments, a method in an electronic device comprises detecting, by a fingerprint sensor, a touch event occurring at the fingerprint sensor. In one or more embodiments, the method comprises capturing, by the fingerprint sensor, fingerprint sensor data samples in response to detecting the touch event.

In one or more embodiments, the method comprises determining, with one or more sensors of the electronic device, whether a first device housing is pivoted about a hinge relative to a second device housing to an axially displaced open position or a closed position. A pre-processor of the fingerprint sensor determines whether the fingerprint sensor data samples are received during a duration that is between a predefined minimum fingerprint sensor actuation duration threshold and a predefined maximum fingerprint sensor actuation duration threshold. In one or more embodiments, the pre-processor discards the fingerprint sensor data samples when the first device housing and the second device housing are pivoted to the closed position and the duration is either less than the predefined minimum fingerprint sensor actuation duration threshold or greater than the predefined maximum fingerprint sensor actuation duration threshold.

Thereafter, the pre-processor can process the fingerprint sensor data samples to determine whether a source of the fingerprint sensor data samples is an authorized user of the electronic device when either the first device housing is pivoted about the hinge relative to the second device housing to the axially displaced open position or, alternatively, the device housing is pivoted about the hinge relative to the second device housing to the closed position and the duration is between the predefined minimum fingerprint sensor actuation duration threshold and the predefined maximum fingerprint sensor actuation duration threshold. In one or more embodiments, the pre-processor records a wrong finger event at the fingerprint sensor or in the pre-processor of the fingerprint sensor when the fingerprint sensor data samples fail to determine the source of the fingerprint sensor data samples is the authorized user of the electronic device and the duration is between the predefined minimum fingerprint sensor actuation duration threshold and the predefined maximum fingerprint sensor actuation duration threshold.

Embodiments of the disclosure provide an electronic device having a user interface. In one or more embodiments, the user interface includes a touch actuator. Examples of such touch actuators include a physical key, a physical button, a touch sensitive surface, or a user actuation target being presented along a touch sensitive display. Other examples of touch actuators will be obvious to those of ordinary skill in the art having the benefit of this disclosure.

In one or more embodiments, the touch actuator has a fingerprint sensor integrated therein. Embodiments of the disclosure contemplate that many electronic device configurations will include touch actuators that are combined with a biometric sensor such as a fingerprint sensor as well. Illustrating by example, many smartphones include a power button located on a minor face of the electronic device. Many electronic devices also include volume up/volume down buttons, silent mode switches, or other user interface controls situated on minor faces of the electronic device. A biometric sensor such as a fingerprint sensor could be integrated with either type of actuator. However, embodiments of the disclosure contemplate that since volume buttons are symmetric, most designers will elect to integrate the fingerprint sensor with a power button.

Where an electronic device is so configured, embodiments of the disclosure contemplate that a user may inadvertently actuate the fingerprint sensor by either holding the device or, alternatively, when trying to actuate one of these other user interface controls. For instance, when trying to turn the volume down using a volume down key, a user may inadvertently press a touch actuator having a fingerprint sensor authentication function. Where this occurs, and where this repeatedly happens, a user can become frustrated.

Advantageously, embodiments of the disclosure help to eliminate such frustrations by determining, with one or more processors, whether at least one predefined condition is occurring concurrently with the actuation of a biometric sensor such as a fingerprint sensor. Examples of such predefined conditions include an electronic device being folded to a closed position, the actuation of the fingerprint sensor being less than a predefined minimum fingerprint sensor actuation duration threshold, exceeding a predefined maximum fingerprint sensor actuation duration threshold, and/or the device moving in excess of a predefined maximum electronic device motion threshold in three-dimensional space. These predefined conditions are illustrative only. Others will be described below. Still others will be obvious to those of ordinary skill in the art having the benefit of this disclosure.

In one or more embodiments, when the predefined condition is occurring while the fingerprint sensor is actuated, the one or more processors of the electronic device or a pre-processor of the fingerprint sensor preclude the fingerprint sensor from processing fingerprint sensor data samples to prevent false authentication. Alternatively, when the predefined condition is occurring while the fingerprint sensor is actuated, the one or more processors or pre-processor pf the fingerprint sensor preclude initiation of the authentication function associated with the fingerprint sensor.

Illustrating by example, in one or more embodiments a touch actuator is configured as a physical key situated along a minor face of an electronic device. In one or more embodiments, a fingerprint sensor is integrated with the touch actuator such that simply contacting the touch actuator executes a user authentication function.

In one or more embodiments, one or more processors of the electronic device determine whether a predefined condition occurs concurrently with, or within a predefined duration of, actuation of this fingerprint sensor. In one or more embodiments, when the predefined condition occurs concurrently with, or within the predefined duration of, the actuation of the fingerprint sensor, the one or more processors preclude the execution of the authentication function. In one or more embodiments, this occurs despite the fact that the fingerprint sensor is left in an operational mode. Illustrating by example, a pre-processor of the fingerprint sensor can discard fingerprint sensor data samples to prevent the operating fingerprint sensor from processing the same. By contrast, when the predefined condition fails to occur concurrently with, or within the predefined duration of, actuation of the fingerprint sensor, the one or more processors or pre-processor allow the fingerprint sensor to execute the authentication function.

Embodiments of the disclosure advantageously optimize touch actuator management to avoid accidental invocation of the authentication function. Without embodiments of the disclosure, such accidental invocations can occur when the touch actuator is inadvertently bumped, brushed, tapped, or held. Where an electronic device is equipped as described herein, one or more processors conclude that actuation of a touch actuator is inadvertent when a predefined condition, such the electronic device being in the closed position and/or the touch input interacting with the touch actuator occurring for less than a predefined minimum fingerprint sensor actuation duration threshold or longer than a predefined maximum fingerprint sensor actuation duration threshold. Embodiments of the disclosure advantageously help to eliminate user frustration occurring when universal function touch actuators are inadvertently actuated.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface 118 of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge 101 relative to the second device housing 103. However, it should be noted that other types of displays suitable for use with the electronic device 100 will be obvious to those of ordinary skill in the art having the benefit of this disclosure. Illustrating by example, in other embodiments multiple displays can be used. For instance, a first rigid display can be coupled to the first device housing 102, while a second, separate rigid display can be coupled to the second device housing 103, with the hinge 101 separating the two displays.

Where a flexible display 121 is used, in one or more embodiments an OLED is constructed on flexible plastic substrates can allow the flexible display 121 to bend with various bending radii. For example, some embodiments allow bending radii of between thirty and six hundred millimeters. Other substrates allow bending radii of around five millimeters to provide a display that is foldable through active bending.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

The electronic device 100 of FIG. 1 is configured as a bendable or "clam shell" device. Electronic devices configured in accordance with embodiments of the disclosure can include a single hinge or multiple hinges as well. In other embodiments, the electronic device 100 of FIG. 1 can be configured as a "candy bar" device with a single device housing that is non-bendable and non-deformable. Illustrating by example, in situations where a biometric sensor 122 is configured as a facial recognition device such as an image capture device or depth scanner as will be explained below with reference to FIG. 13, there is no requirement that the electronic device 100 be bendable or deformable. Indeed, the electronic device 100 can simply be a candy bar device supporting the biometric sensor 122.

The illustrative electronic device 100 of FIG. 1 supports a touch actuator 123 situated on a minor surface of the first device housing 102. While one touch actuator 123 is shown in FIG. 1, in other embodiments the electronic device 100 can support several touch actuators. While the touch actuator 123 of FIG. 1 is configured as a push button, it should be noted that the touch actuator 123 can take other forms as well. In another embodiment, the touch actuator 123 can be configured as a touch sensitive surface. In still other embodiments, the touch actuator 123 is configured as a rocker switch, a slider switch, or another type of touch switch.

Other examples of touch actuators include the use of a force sensor comprising resistive switches or a force switch array configured to detect contact with either the first device housing 102 or the second device housing 103. The array of resistive switches can function as a force-sensing layer defining one or more touch actuators, in that when contact is made with either the surface of the first device housing 102 or the second device housing 103, changes in impedance of any of the switches may be detected. The array of switches may be any of resistance sensing switches, membrane switches, force-sensing switches such as piezoelectric switches, or other equivalent types of technology.

In another embodiment, the force sensor serving as the touch actuator can be capacitive. In yet another embodiment, piezoelectric sensors can be configured to sense touch as well. For example, where positioned along a surface of the first device housing 102 or second device housing 103, the piezoelectric sensors can be configured to detect an amount of displacement of surfaces of these device housings to determine that a touch actuator defined by the piezoelectric sensors has been actuated.

Still other examples of touch actuators will be obvious to those of ordinary skill in the art having the benefit of this disclosure. Regardless of type, in one or more embodiments the touch actuator 123 is configured to receive touch input for actuation, communicating electronic signals corresponding to this touch input and/or actuation to one or more processors 112 of the electronic device 100.

In the illustrative embodiment of FIG. 1, touch actuator 123 comprises a power touch actuator. Actuating this touch actuator 123 turns the electronic device ON or OFF. Other examples of touch actuators include a volume up touch actuator, a volume down touch actuator, and so forth. These functions are explanatory only, as other electronic devices will include touch actuators that have different functions associated therewith. However, in many smartphone configurations, the inclusion of a power touch actuator, volume up touch actuator, and volume down touch actuator is common.

In one or more embodiments, touch actuator 123 is special and distinct from other touch actuators the first device housing or second device housing may support, e.g., user interface component 108, in that a fingerprint sensor 120 is integrated into the touch actuator 123. Said differently, in one or more embodiments touch actuator 123 has associated therewith a predefined function, which authenticates a source of data delivered to the touch actuator 123 as an authorized user of the electronic device 100. Where so configured, delivery of touch input to touch actuator 123 will cause initiation or execution of a user authentication function.

In other embodiments, the fingerprint sensor 120 will be configured as a stand-alone component. Illustrating by example, the user interface component 108 carried by the second device housing 103 could be a dedicated fingerprint sensor. Other configurations and locations for a fingerprint sensor or other biometric sensor 122, one example of which is a facial scanning image capture device 126, will be obvious to those of ordinary skill in the art having the benefit of this disclosure.

In the illustrative embodiment of FIG. 1, the touch actuator 123 is situated on a minor face or edges of the electronic device 100. In other embodiments, touch actuators can be positioned on major faces, or along a combination of major faces and minor faces. Moreover, the configuration of the touch actuator 123 shown in FIG. 1 should be understood to be illustrative, as others are within the scope of the disclosure.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100.

Various components can be electrically coupled together by conductors or a bus disposed along one or more printed circuit boards. For example, some components of the block diagram schematic 110 can be configured as a first electronic circuit fixedly situated within the first device housing 102, while other components of the block diagram schematic 110 can be configured as a second electronic circuit fixedly situated within the second device housing 103. In one or more embodiments, a flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
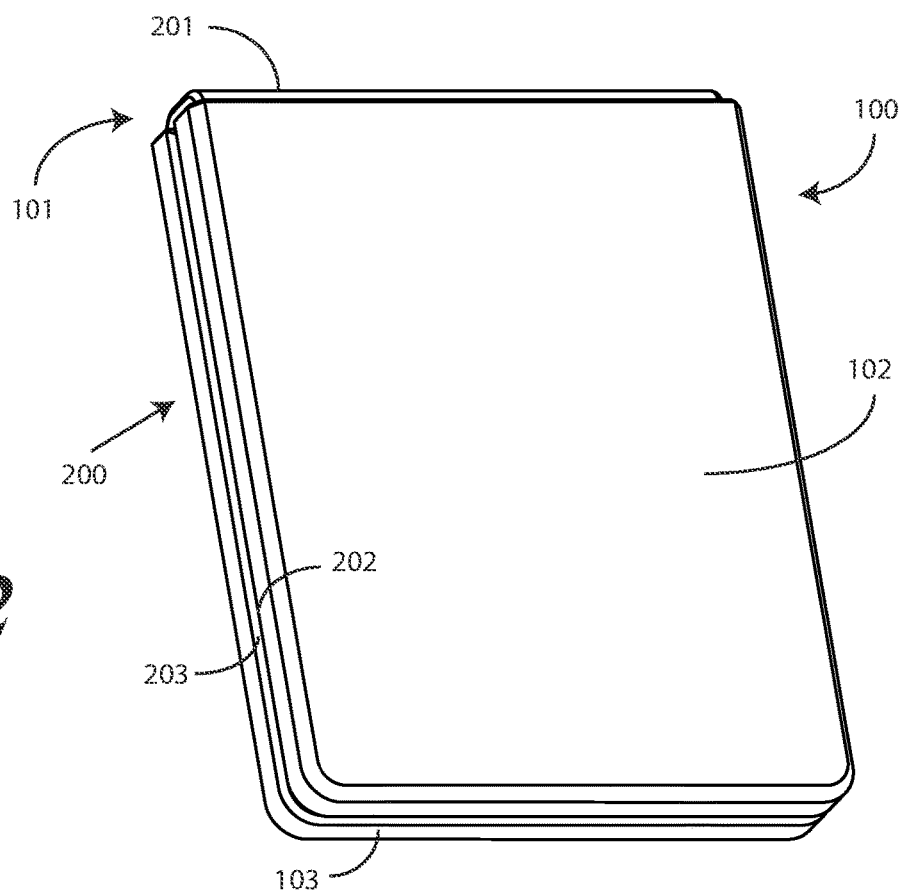
FIG. 2 illustrates the electronic device of FIG. 1 in a closed position.
Figure 3:
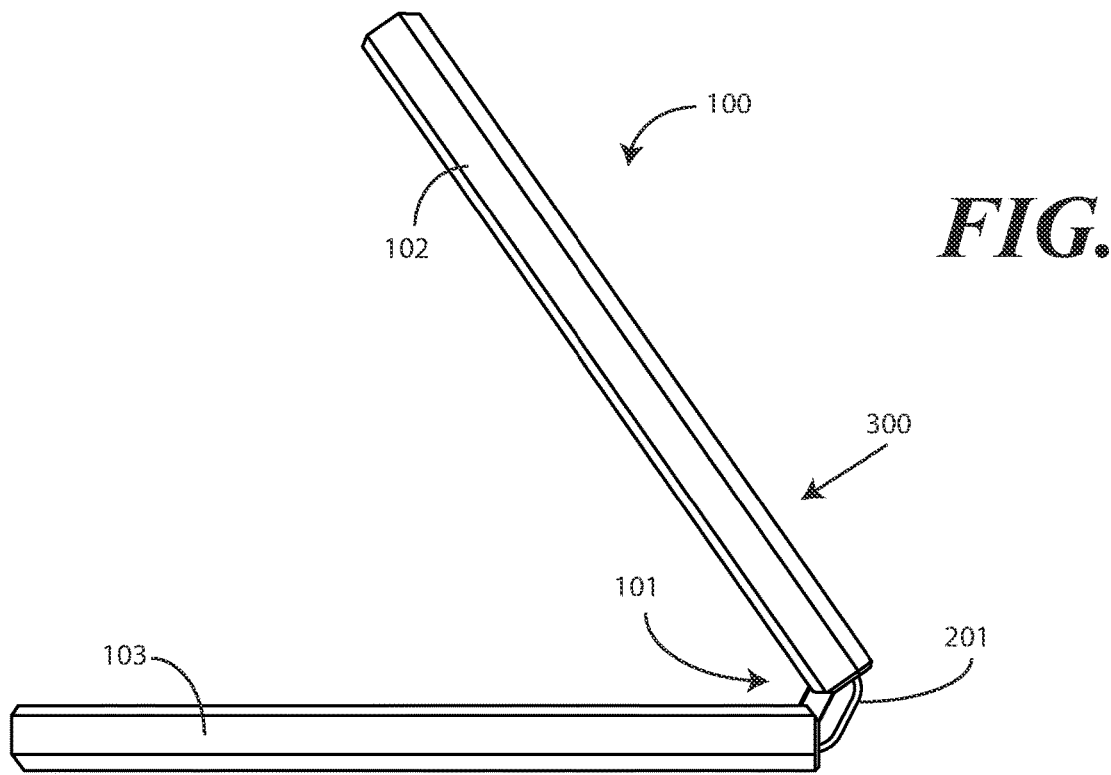
FIG. 3 illustrates the electronic device of FIG. 1 in a partially folded position.

In one embodiment, the electronic device 100 optionally includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the touch actuator 123, the fingerprint sensor 120, the user interface 118, or the other sensors 119. The one or more processors 112 may also generate commands or execute control operations based upon information received from a combination of the one or more flex sensors 117, the touch actuator 123, the fingerprint sensor 120, the user interface 118, or the other sensors 119. Alternatively, the one or more processors 112 can generate commands or execute control operations based upon information received from the one or more flex sensors 117 and the touch actuator 123 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

The one or more sensors 119 can, in one or more embodiments, determine whether a predefined condition is occurring when various operations of the electronic device are carried out, or while various types of user input are being received. For instance, in one or more embodiments the one or more sensors 119 can determine whether the electronic device 100 is oriented in a portrait mode in three-dimensional space, as shown in FIG. 1, or whether the electronic device 100 is oriented in a landscape mode in three-dimensional space. In one or more embodiments, the one or more sensors 119 can additionally sense whether the minor face with touch actuator 123 is atop the electronic device 100 relative to a direction of gravity, or alternatively whether the minor face with touch actuator 123 is below the electronic device relative to the direction of gravity.

In one or more embodiments, the one or more sensors 119 include one or more inertial motion units. In one or more embodiments, each inertial motion unit comprises a combination of one or more accelerometers and one or more gyroscopes. Each inertial motion unit can optionally comprise one or more magnetometers. The electronic device 100 of FIG. 1 may only one inertial motion unit or, alternatively, can include one inertial motion unit in the first device housing 102 and another in the second device housing 103, and so forth.

In one or more embodiments, the function of the inertial motion unit is to determine the orientation, angular velocity, and/or specific force of the electronic device in three-dimensional space. When included in the electronic device 100, the inertial motion unit(s) can be used as an orientation sensor to measure the orientation of the first device housing 102 and the second device housing 103 in three-dimensional space. Similarly, the inertial motion unit can be used as an orientation sensor to measure the motion of the electronic device 100 in three-dimensional space. The inertial motion unit can be used to make other measurements as well. Additionally, the inertial motion unit can be used to sense some of the gestures of the user, such as one talking with their hands, running, or walking.

In one or more embodiments, each inertial motion unit determines an orientation of the device housing in which it is situated in three-dimensional space. For example, the inertial motion units can be configured to determine an orientation, which can include measurements of azimuth, plumb, tilt, velocity, angular velocity, acceleration, and angular acceleration, of the first device housing 102 and second device housing 103 independently in one or more embodiments.

In other embodiments, rather than including an inertial motion unit, the one or more sensors 119 can include simpler devices that function as motion detectors. Illustrating by example, the one or more sensors 119 may include just a single accelerometer, a single gyroscope, or a combination thereof. For instance, an accelerometer may be embedded in the electronic circuitry of the electronic device 100 to show vertical orientation, constant tilt and/or whether the electronic device 100 is stationary in three-dimensional space. A gyroscope can be used in a similar fashion.

Regardless of the type of motion detectors that are used, they are operable to detect one or more of movement, and direction of movement, of the electronic device 100 by a user. These motion sensors can also be used to detect motion corresponding to a user's body or to human motion. This information can be used to determine that the electronic device 100 is proximately located with a user's body, such as is the case when the electronic device 100 is disposed or situated within a pocket.

Many of the one or more sensors 119 in the electronic device 100 can be used to detect movement, gestures, or other user input. For example, the one or more sensors 117 can include one or more proximity sensors can detect the gesture of a user waving a hand above the display 105. In another embodiment, the user can deliver gesture input by touching the display 105. In yet another embodiment, the accelerometer can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers or a gyroscope.

Other components 124 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, a fingerprint sensor 120 is operable with the one or more processors 112. In one embodiment, the fingerprint sensor 120 includes its own associated pre-processor 125 to perform various functions, including detecting a finger touching the fingerprint sensor 120, capturing and storing fingerprint data from the finger, discarding fingerprint sensor data samples under certain conditions to preclude the fingerprint sensor 120 from processing the fingerprint sensor data samples, authenticating a user by comparing captured fingerprint sensor data samples to stored fingerprint data, and/or detecting user actions across a surface of the fingerprint sensor 120 and/or touch actuator 123.

In one embodiment, the fingerprint sensor 120 includes a plurality of sensors. The fingerprint sensor 120 can be a complementary metal-oxide-semiconductor active pixel sensor digital imager or any other fingerprint sensor. For example, in one embodiment the plurality of sensors comprise indium-tin oxide electrical conductors that are deposited along a surface of the fingerprint sensor 120.

The fingerprint sensor 120 can be configured to capture, with the plurality of sensors, a live scan of a fingerprint pattern from a finger disposed along its surface, and to store this information as one or more sensors fingerprint sensor data samples from the user's finger. The fingerprint sensor 120 may also be able to capture one or more images with the plurality of sensors. The images can correspond to an area beneath a surface of skin. The fingerprint sensor 120 can compare the fingerprint sensor data samples or skin images to one or more references to authenticate a user in an authentication process.

In one or more embodiments, the fingerprint sensor 120 can optionally detect user actions across the fingerprint sensor 120. One example of such an action is detecting the rotation of an object, such as a finger, contacting the fingerprint sensor 120 about an axis normal to the contact surface of the fingerprint sensor 120. Illustrating by example, once the fingerprint sensor 120 detects a user's finger touching the contact surface of the fingerprint sensor 120, the fingerprint sensor 120 can then detect an action of the finger along the fingerprint sensor 120.

Embodiments of the disclosure contemplate that it can be advantageous to collocate the fingerprint sensor 120 with touch actuator 123, as doing so improves the overall appearance, prevents the ingress of liquids and other materials, and reduces cost. Thus, in one or more embodiments the fingerprint sensor 120 is simply integrated into the outer surface of touch actuator 123.

In one or more embodiments, the pre-processor 125 of the fingerprint sensor 120 may generate commands or execute control operations based on information received from touch input occurring along a contact surface of the fingerprint sensor 120. The pre-processor 125 of the fingerprint sensor 120 may also generate commands or execute control operations based upon information received from a combination of the fingerprint sensor 120 and one or more motion detectors of the one or more other sensors 119 and/or the flex sensor 117. Moreover, the pre-processor 125 of the fingerprint sensor 120 may process the received information alone or in combination with other data, such as the information stored in the memory 113.

In one or more embodiments, the one or more processors 112 and/or the pre-processor 125 of the fingerprint sensor 120 (where included) can assign a quality score to fingerprint sensor data samples obtained from the fingerprint sensor 120 when the fingerprint sensor 120 scans or otherwise attempts to detect an object such as a finger being proximately located with the fingerprint sensor 120. This quality score can be a function of one or more factors, including the number of fingerprint features found in a scan or image, the signal to noise ratio of the scan or image, the contrast of the scan or image, or other metrics. The one or more processors 112, or alternatively the pre-processor 125 of the fingerprint sensor 120, can then compare fingerprint data captured by the fingerprint sensor 120 to a reference file stored in memory 113 to authenticate a user as an authorized user of the electronic device 100.

In one or more embodiments, the pre-processor 125 of the fingerprint sensor 120 can optionally assign a quality score to fingerprint data obtained from the fingerprint sensor 120. The quality score assigned can be a function of one or more factors, including the number of fingerprint features from the finger found in a scan or image, the signal to noise ratio of the scan or image, or the contrast of the scan or image. Other quality metrics will be obvious to those of ordinary skill in the art having the benefit of this disclosure. The pre-processor 125 of the fingerprint sensor 120 can optionally compare the quality score to a predefined threshold to determine whether the object is indeed a finger, and even preclude the fingerprint data from consideration for authentication if the quality score is too low.

Where the quality score is omitted, or where the quality score is included and is sufficiently high, in one or more embodiments the pre-processor 125 of the fingerprint sensor 120 can then attempt to authenticate the fingerprint sensor data samples. The pre-processor 125 of the fingerprint sensor 120 can do this by comparing the fingerprint data to a reference file stored in memory 113. Where there is a sufficient match, the pre-processor 125 of the fingerprint sensor 120 can perform a control operation. Examples of control operations include unlocking the electronic device 100, actuating the display 105, actuating apps, making stored data available to the authorized user of the electronic device 100, rotating content being presented on the display 105, and so forth. Other control operations will be obvious to those of ordinary skill in the art having the benefit of this disclosure. Where there is not a sufficient match, the pre-processor 125 of the fingerprint sensor 120 can take no action, or alternatively lock the electronic device 100.

The pre-processor 125 of the fingerprint sensor 120 can be an on-board processor included with the fingerprint sensor 120. Alternatively, the pre-processor 125 of the fingerprint sensor 120 can be a secondary processor that is external to, but operable with, the fingerprint sensor 120 in another embodiment. Other configurations will be obvious to those of ordinary skill in the art having the benefit of this disclosure.

In one or more embodiments, the pre-processor 125 of the fingerprint sensor 120 is operable with the one or more processors 112. In some embodiments, the one or more processors 112 can control the pre-processor 125 of the fingerprint sensor 120. In other embodiments, the pre-processor 125 of the fingerprint sensor 120 can operate independently, delivering information gleaned from the touch actuator 123, the one or more sensors 119, the fingerprint sensor 120, and/or the other components 124, and other contextual information to the one or more processors 112.

In addition to detecting actuation of the touch actuator 123 and receiving fingerprint sensor data samples from the fingerprint sensor 120, in one or more embodiments the pre-processor 125 of the fingerprint sensor 120 is operable with the one or more sensors 119 to determine whether a predefined condition is occurring when the fingerprint sensor 120 is actuated. In one or more embodiments, when a predefined condition is detected when the fingerprint sensor 120 is actuated, the pre-processor 125 of the fingerprint sensor 120 precludes the execution of the user authentication function of the fingerprint sensor 120. By contrast, in one or more embodiments when the predefined condition fails to occur when the fingerprint sensor 120 is actuated, the pre-processor 125 of the fingerprint sensor 120 executes the user authentication operation in response to the actuation of the fingerprint sensor 120.

Under normal conditions, the pre-processor 125 of the fingerprint sensor 120 performs a method of causing at least some fingerprint sensor data samples to be processed by the fingerprint sensor 120 to authenticate a source of the fingerprint sensor data samples as an authorized user of the electronic device 100. In one or more embodiments, this happens when either the first device housing 102 and second device housing 103 are pivoted about the hinge 101 to the axially displaced open position of FIG. 1 when the fingerprint sensor data samples are received. Alternatively, it can occur when the first device housing 102 and the second device housing 103 are pivoted about the hinge 101 to the closed position shown below in FIG. 2 when the fingerprint sensor data samples are received within a duration window that is between a predefined minimum fingerprint sensor actuation duration threshold and a predefined maximum fingerprint sensor actuation duration threshold.

However, as noted above, embodiments of the disclosure contemplate that a user may inadvertently actuate the fingerprint sensor 120 by touching touch actuator 123. As will be shown below with reference to FIGS. 5-6, this can occur simply when the user is holding the electronic device 100 while in a closed position. Alternatively, this may occur when a user is trying to turn the volume down using a volume down key. When searching for that volume key, the user may inadvertently touch the touch actuator 123, which has the fingerprint sensor 120 integrated therewith in this example. Where this occurs, and where this repeatedly happens, a user can become frustrated, as the device may lock after a sufficient number of authentication failures. This requires entry of a passcode or PIN, which is time consuming and cumbersome.

Advantageously, embodiments of the disclosure help to eliminate such frustrations by determining, with pre-processor 125 of the fingerprint sensor 120, whether at least one predefined condition is occurring concurrently with the actuation of the fingerprint sensor 120. Examples of such predefined conditions include the electronic device 100 being folded to a closed position, the actuation of the fingerprint sensor 120 occurring for less than a predefined minimum fingerprint sensor actuation duration threshold, occurring for more than a predefined maximum fingerprint sensor actuation duration threshold, and/or the electronic device 100 moving in excess of a predefined maximum electronic device motion threshold in three-dimensional space. Examples of each will be described in more detail below with reference to FIGS. 8-12. These predefined conditions are illustrative only. Others will be described below.

Still others will be obvious to those of ordinary skill in the art having the benefit of this disclosure.

In one or more embodiments, when the predefined condition is occurring while the fingerprint sensor 120 is actuated, the pre-processor 125 of the fingerprint sensor 120 precludes the fingerprint sensor 120 from processing fingerprint sensor data samples to prevent false authentication. Alternatively, when the predefined condition is occurring while the fingerprint sensor 120 is actuated, the pre-processor 125 of the fingerprint sensor 120 precludes initiation of the authentication function associated with the fingerprint sensor.

In one or more embodiments, the pre-processor 125 of the fingerprint sensor 120 determines whether a predefined condition occurs concurrently with, or within a predefined duration of, actuation of the fingerprint sensor 120. In one or more embodiments, when the predefined condition occurs concurrently with, or within the predefined duration of, the actuation of the fingerprint sensor 120, the pre-processor 125 of the fingerprint sensor 120 precludes the execution of the authentication function.

In one or more embodiments, this occurs despite the fact that the fingerprint sensor 120 is left in an operational mode. Said differently, this occurs without the fingerprint sensor 120 being in a low-power or sleep mode. Illustrating by example, the pre-processor 125 of the fingerprint sensor 120 can discard fingerprint sensor data samples to prevent the operating fingerprint sensor 120 from processing the same. By contrast, when the predefined condition fails to occur concurrently with, or within the predefined duration of, actuation of the fingerprint sensor 120, the pre-processor 125 of the fingerprint sensor 120 allows the fingerprint sensor 120 to execute the authentication function.

Embodiments of the disclosure advantageously optimize touch actuator management to avoid accidental invocation of the authentication function. Without embodiments of the disclosure, such accidental invocations can occur when the touch actuator is inadvertently bumped, brushed, tapped, or held. Where the electronic device 100 is equipped as described herein, the pre-processor 125 of the fingerprint sensor 120 concludes that actuation of the fingerprint sensor 120 is inadvertent when a predefined condition, such the electronic device 100 being in the closed position and/or the touch input interacting with the fingerprint sensor 120 occurring for less than a predefined minimum fingerprint sensor actuation duration threshold or longer than a predefined maximum fingerprint sensor actuation duration threshold. Embodiments of the disclosure advantageously help to eliminate user frustration occurring when universal function touch actuators are inadvertently actuated.

In one or more embodiments, the pre-processor 125 of the fingerprint sensor 120 works while the one or more processors 112 of the electronic device 100 are in a low-power or sleep mode. By providing the preclusion function, the pre-processor 125 of the fingerprint sensor 120 can allow the one or more processors 112 to remain in the low-power or sleep mode until the source of fingerprint sensor data samples is authenticated as an authorized user of the electronic device 100. Thereafter, the one or more processors 112 can be returned to their operational mode, thereby conserving power and extending run time of the electronic device 100.

Details of the various predefined conditions and mechanisms for precluding execution or initiation of the authentication function will be described in more detail below with reference to FIGS. 8-13, which are incorporated by reference into FIG. 1 in the event that the claims are restricted by figure. It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Turning now to FIGS. 4 and 5, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 121, the flexible display 121 has been elongated into a flat position.

Figure 6:
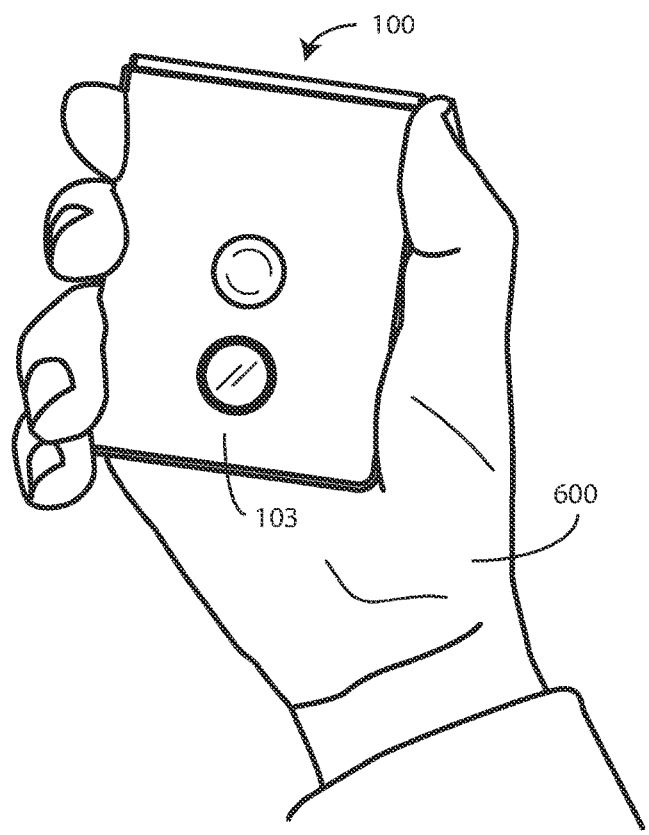
FIGS. 6-7 illustrate a user inadvertently actuating a biometric sensor in an electronic device configured in accordance with one or more embodiments of the disclosure.
Figure 7:
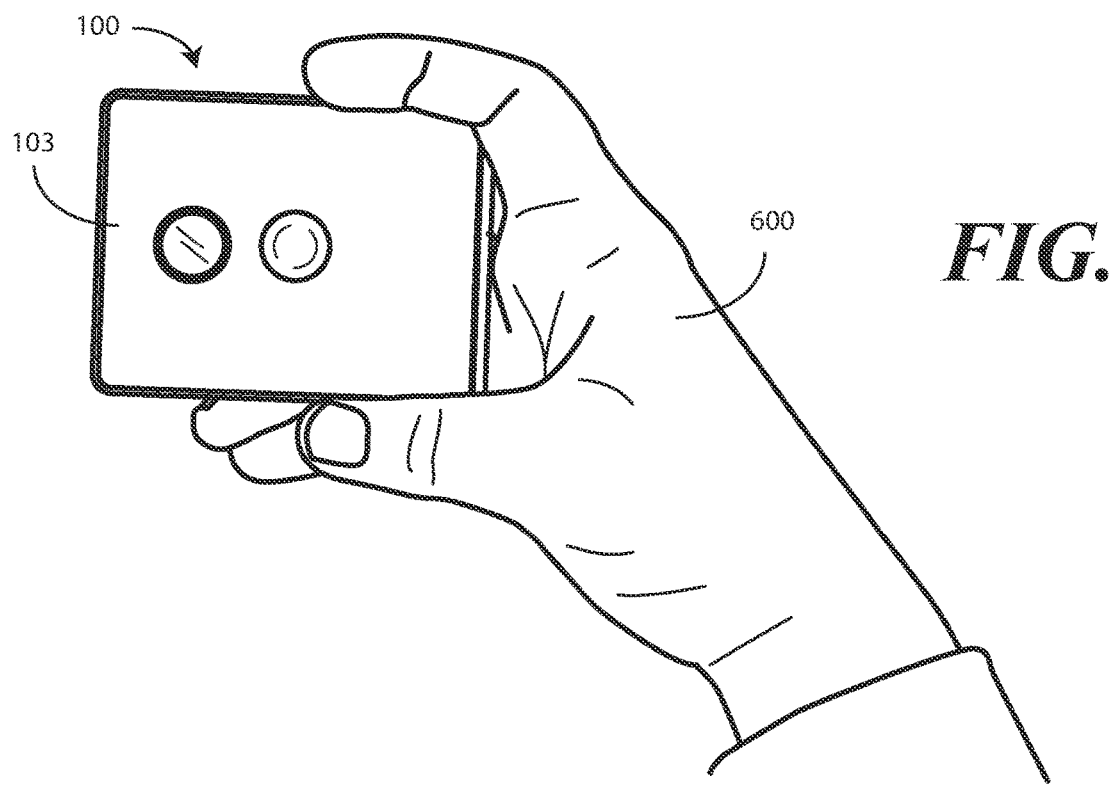

Turning now to FIGS. 6-7, illustrated therein are scenarios illustrating how touch actuator (123), with the fingerprint sensor (120) integrated therein, can receive touch input inadvertently simply by a user 600 holding the electronic device 100. As shown in FIG. 6, the user is simply gripping the electronic device 100 while in the closed position in a portrait orientation. As shown, the user's thumb covers the touch actuator (123). This means that the fingerprint sensor (120) is receiving one or more fingerprint sensor data samples. However, it is clear that the user 600 does not desire to unlock the electronic device 100 because the electronic device 100 is in the closed position, thereby keeping the display (105) concealed. The user 600 is about to get frustrated, however, because the casually placed thumb around the fingerprint sensor is likely to cause authentication fails. Accordingly, when the user 600 opens the electronic device 100, they will likely have to enter a passcode or PIN as a secondary authentication factor.

Similarly, as shown in FIG. 7, the user 600 is using a pinch grip to hold the electronic device 100 in a landscape orientation while in the closed position. This grip will almost certainly lead to authorization failures, as the middle of the forefinger—instead of the fingertip—is seated atop the touch actuator (123) and its outer surface defining the sensor of the fingerprint sensor (120). Accordingly, when the user 600 opens the electronic device 100, they will likely have to enter a passcode or PIN as a secondary authentication factor. This will lead to frustration, angst, and a less than optimal user experience.

Embodiments of the disclosure advantageously provide a solution to this problem by configuring the pre-processor (125) of the fingerprint sensor (120) to preclude the fingerprint sensor (120) from processing at least some fingerprint sensor data samples under certain conditions. Illustrating by example, in one or more embodiments the pre-processor (125) of the fingerprint sensor (120) discards at least some fingerprint sensor data samples received by the fingerprint sensor (120) when the fingerprint sensor (120) is actuated while the electronic device 100 is in the closed position and at least one predefined condition is occurring.

The predefined condition can vary. In one or more embodiments, the predefined condition is simply the fact that the first device housing (102) and the second device housing 103 are pivoted to the closed position. Thus, in one or more embodiments the pre-processor (125) of the fingerprint sensor (120) discards at least some fingerprint sensor data samples received by the fingerprint sensor (120) when the fingerprint sensor (120) is actuated while the first device housing (102) and second device housing 103 are in the closed position.

Other predefined conditions can be combined with this "discard while closed" fingerprint sensor data samples preclusion is occurring. Embodiments of the disclosure contemplate that if a user 600 touches a fingerprint sensor (120) to quickly, the user 600 likely did not intend to unlock the electronic device 100 using the fingerprint sensor (120). Similarly, if the user 600 grips the fingerprint sensor (120) for a very long time as shown in FIGS. 6-7, it is likely the case that the user 600 is simply holding the electronic device 100 while inadvertently touching the fingerprint sensor (120).

Accordingly, in one or more embodiments the pre-processor (125) of the fingerprint sensor (120) discards at least some fingerprint sensor data samples received by the fingerprint sensor (120) when the fingerprint sensor (120) is actuated while the first device housing (102) and the second device housing 103 are in the closed position and at least one other predefined condition is occurring. In one or more embodiments, that predefined condition comprises the fingerprint sensor (120) receiving the fingerprint sensor data samples for either less than a predefined minimum fingerprint sensor actuation duration threshold or more than a predefined maximum fingerprint sensor actuation duration threshold.

Thus, in one or more embodiments if the electronic device 100 is closed and a user touches the fingerprint sensor (120) too quickly or holds the fingerprint sensor for too long the pre-processor (125) of the fingerprint sensor (120) discards at least some fingerprint sensor data samples to prevent false authentication. By contrast, the pre-processor (125) of the fingerprint sensor (120) can cause the fingerprint sensor data samples to be processed to authenticate a source of the fingerprint sensor data samples as an authorized user of the electronic device 100 when the first device housing (102) and second device housing 103 are either pivoted to the axially displaced open position when the fingerprint sensor data samples are received or, alternatively, pivoted to the closed position while the fingerprint sensor data samples are received during a duration that is between the predefined minimum fingerprint sensor actuation duration threshold and the predefined maximum fingerprint sensor actuation duration threshold.

In one or more embodiments, this fingerprint sensor processing preclusion via the discard of the fingerprint sensor data samples occurs while the one or more processors (112) of the electronic device are in a low-power or sleep mode. By using the pre-processor (125) of the fingerprint sensor (120) to discard the fingerprint sensor data samples when the predefined condition(s) are occurring, the one or more processors (112) can be left in the low-power or sleep mode until the fingerprint sensor (120) actually authenticates a source of the fingerprint sensor data samples as the authorized user of the electronic device 100. This saves power and extends run time of the electronic device.

In still other embodiments, the predefined condition is defined by motion of the electronic device 100. Embodiments of the disclosure contemplate that when the user 600 intends to use a biometric sensor such as the fingerprint sensor (120) to unlock the electronic device 100, they frequently hold the electronic device 100 relatively still. Accordingly, in one or more embodiments the pre-processor (125) of the fingerprint sensor (120) discards at least some fingerprint sensor data samples received by the fingerprint sensor (120) when the fingerprint sensor (120) is actuated while the first device housing (102) and the second device housing 103 are in the closed position and at least one other predefined condition is occurring, with that predefined condition comprising the motion of the electronic device 100 in three-dimensional space exceeding a predefined maximum electronic device motion threshold.

Now that the hardware and potential problems associated with not employing the precluding operations offered by embodiments of the disclosure are understood, examples of this operation will now be described in more detail with reference to FIGS. 8-13. Beginning with FIG. 8, illustrated therein is one explanatory method 800 of using the electronic device 100 of FIG. 1, or another similarly configured electronic device in accordance with embodiments of the disclosure.

Figure 8:
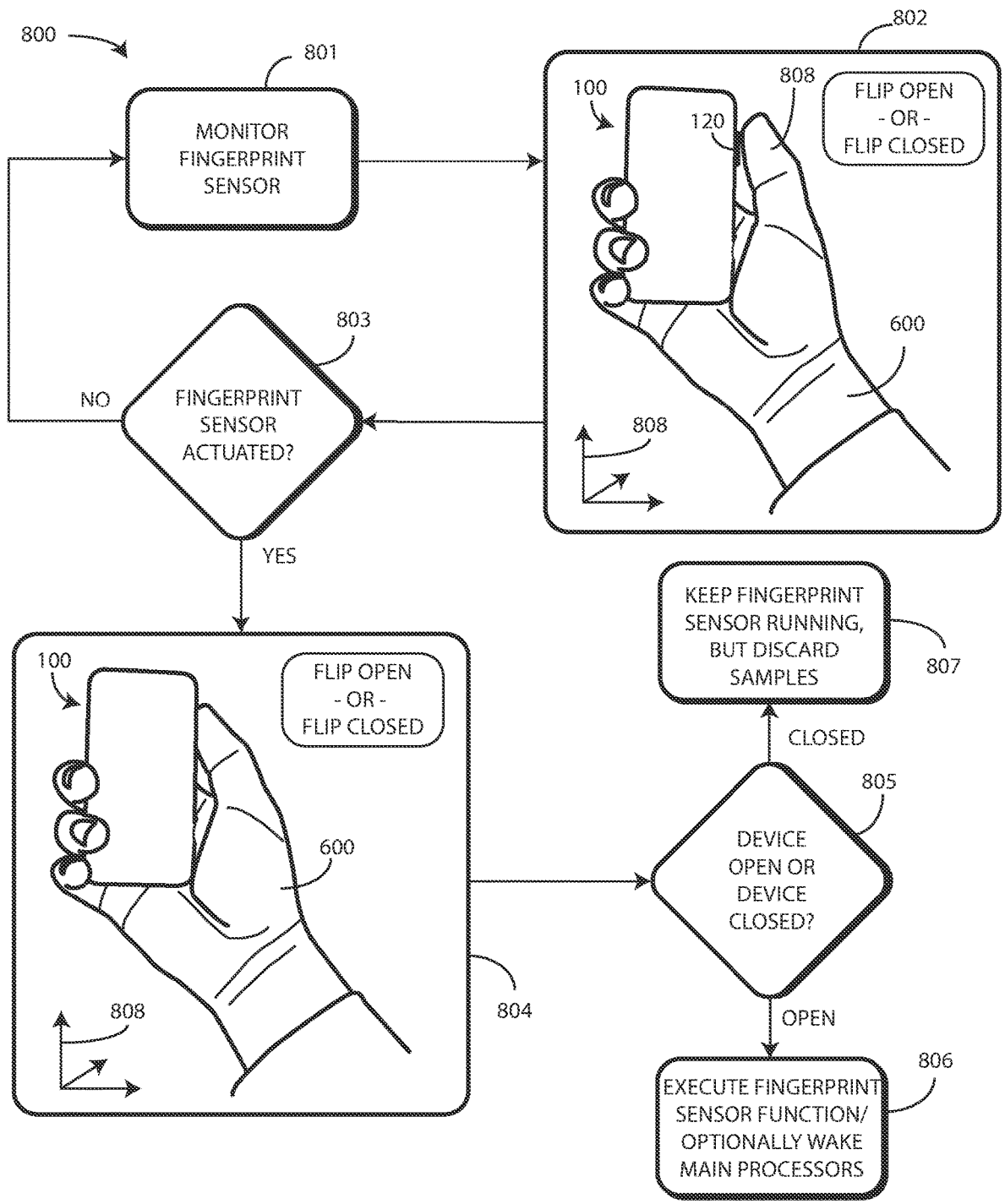
FIG. 8 illustrates one explanatory method in accordance with one or more embodiments of the disclosure.

The method 800 of FIG. 8 determines whether at least one predefined condition is occurring concurrently with the actuation of a biometric sensor, which in this illustrative example is a fingerprint sensor 120. As described above with reference to FIG. 1, in this illustrative example the fingerprint sensor 120 is situated on a minor surface of the electronic device 100 as shown and is integrated into a touch actuator (123). Since the geometric configuration of the electronic device 100 can be either in the closed position or the axially displaced open position at, for example, steps 802 and 804, despite having a first device housing (102) that is pivotable about a hinge (101) relative to a second device housing between the axially displaced open position and the closed position, the electronic device 100 is shown as a generic box in this figure.

In one or more embodiments, the method 800 of FIG. 8 determines whether at least one predefined condition is occurring concurrently with the actuation of the fingerprint sensor 120. When the at least one predefined condition is occurring concurrently with the actuation of the fingerprint sensor 120, a pre-processor (125) of the fingerprint sensor 120 precludes processing of a plurality of fingerprint sensor data samples received by the fingerprint sensor 120 in response to determining that the at least one predefined condition was occurring. In one or more embodiments, the pre-processor (125) of the fingerprint sensor 120 perform the preclusion while the fingerprint sensor 120 remains operational.

It should be noted that while the pre-processor (125) of the fingerprint sensor 120 is described as performing this precluding function, which allows one or more processors (112) of the electronic device 100 to advantageously remain in a low-power or sleep mode, the one or more processors (112) could equally perform the method 800 of FIG. 8 in other embodiments. In still other embodiments, a process engine of the one or more processors 112 can perform the method 800 of FIG. 8.

Beginning at step 801, the pre-processor (125) of the fingerprint sensor 120 of the electronic device 100 monitor for actuation of the fingerprint sensor 120 of the electronic device 100. As shown at step 802, a user 600 actuates the fingerprint sensor 120 by touching the touch actuator (123) situated on a minor face of the electronic device 100 with a thumb 809.

At decision 803, the pre-processor (125) of the fingerprint sensor 120 of the electronic device 100 detect this actuation of the fingerprint sensor 120. Since actuation occurs at step 802, the method 800 proceeds from decision 803 to step 804. Had no actuation of the fingerprint sensor 120 occurred at step 802, the method 800 would have returned from decision 803 to step 801 so that the pre-processor (125) of the fingerprint sensor 120 could continue to monitor the fingerprint sensor 120.

As shown at step 804, the user 600 is indeed delivering touch input to the fingerprint sensor 120. At decision 805, the pre-processor (125) of the fingerprint sensor 120 determines whether at least one predefined condition is occurring concurrently with the actuation of the fingerprint sensor 120. At step 807, when the at least one predefined condition is occurring concurrently with the actuation of the fingerprint sensor 120 of the electronic device 100, the pre-processor (125) of the fingerprint sensor 120 precludes processing of a plurality of fingerprint sensor data samples in response to determining the at least one predefined condition. In one or more embodiments, step 807 occurs while the fingerprint sensor 120 remains fully operational.

In the illustrative example of FIG. 8, the at least one predefined condition comprises determining whether the electronic device 100 is in the axially displaced open position or the closed position, as indicated at decision 805. Said differently, when the electronic device 100 comprises a first device housing (102) coupled to a second device housing (103) by a hinge (101) such that the first device housing (102) is pivotable about the hinge (101) relative to the second device housing (103) between an axially displaced open position an display assembly closed position, in one or more embodiments the at least one predefined condition comprises the first device housing (102) and the second device housing (103) being pivoted to the closed position. Accordingly, when the electronic device 100 is in the closed position, in one or more embodiments step 807 comprises the pre-processor (125) of the fingerprint sensor 120 precluding the fingerprint sensor 120 from processing a plurality of fingerprint sensor data samples.

By contrast, at step 806 the pre-processor (125) of the fingerprint sensor 120 causes the fingerprint sensor data samples to be processed to authenticate a source, here the user 600, of the fingerprint sensor data samples as an authorized user of the electronic device 100 when the electronic device 100 is pivoted to the axially displaced open position. Where the steps of the method 800 of FIG. 8 occur while the one or more processors (112) of the electronic device 100 are maintained in a low-power or sleep mode of operation while the fingerprint sensor 120 is in an active mode of operation and the electronic device 100 is in a locked state, step 806 can optionally comprise waking the one or more processors (112) when the processing of the fingerprint sensor data samples authenticates the source of the fingerprint sensor data samples as the authorized user of the electronic device 100.

Figure 9:
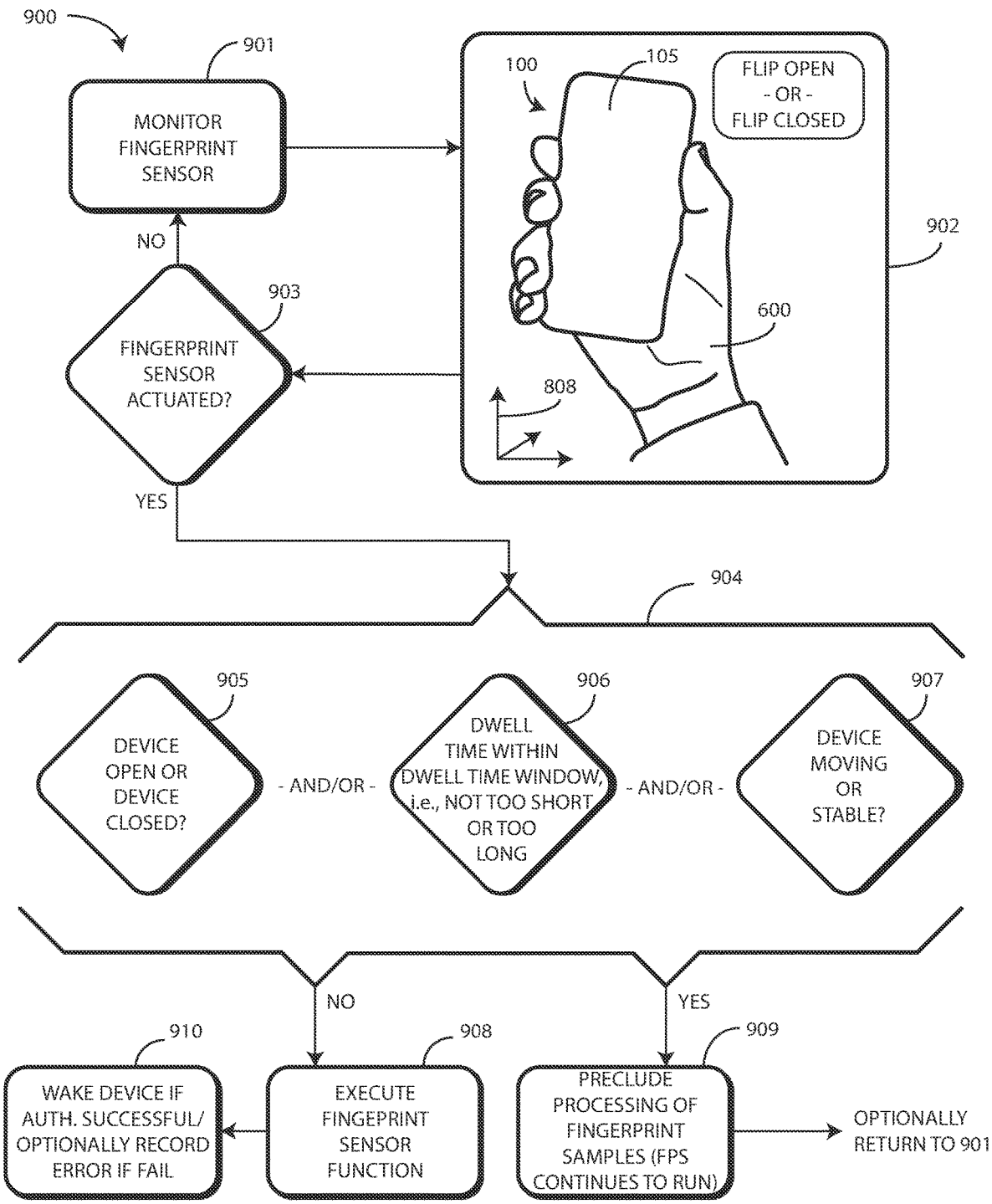
FIG. 9 illustrates another explanatory method in accordance with one or more embodiments of the disclosure.

It should be noted that while the geometric configuration of the electronic device 100, i.e., whether the electronic device 100 is in the axially displaced open position or the closed position, is one example of a predefined condition that may cause the pre-processor (125) of the fingerprint sensor 120 to preclude the fingerprint sensor 120 from processing fingerprint sensor data samples, at least temporarily, there are others as well. Additionally, the at least one predefined condition can comprise multiple predefined conditions. For example, the at least one predefined condition can comprise the geometric configuration of the electronic device 100 combined with how long actuation of the fingerprint sensor 120 occurs. Similarly, the at least one predefined condition can comprise the geometric configuration of the electronic device 100 combined with motion of the electronic device exceeding a predefined maximum electronic device motion threshold. Of course, these predefined conditions can be combined as well. Turning now to FIG. 9, illustrated therein is a method 900 explaining how this can occur.

The method 900 of FIG. 9 precludes a biometric sensor, which can be a fingerprint sensor, an image capture device performing facial recognition, a depth scanner performing facial recognition, an audio input performing voice analysis, or other type of biometric sensor, from processing one or more biometric data samples under certain conditions. In one or more embodiments, the method 900 precludes the biometric sensor from processing the one or more biometric data samples by discarding those biometric data samples while the biometric sensor remains operational.

Illustrating by example, when at least one predefined condition is occurring concurrently with the actuation of the biometric sensor, one or more processors (112) of an electronic device 100 or a pre-processor (125) of the fingerprint sensor (120) can preclude processing of biometric data samples received by the biometric sensor during the actuation of the biometric sensor in response to the at least one predefined condition occurring concurrently with the actuation of the biometric sensor. The predefined condition can comprise a first device housing being pivoted relative to a second device housing in a hinged device to a closed position, actuation of the biometric sensor occurring less than a predefined minimum biometric sensor actuation duration threshold, actuation of the biometric sensor occurring more than a predefined maximum biometric sensor actuation duration threshold, motion of the electronic device 100 in three-dimensional space 808 exceeding a predefined maximum electronic device motion threshold, or combinations thereof. Other predefined conditions that may cause the one or more processors (112) of the electronic device 100 or a pre-processor (125) of the fingerprint sensor (120) to discard biometric data samples or otherwise preclude the biometric sensor from processing the biometric data samples will be obvious to those of ordinary skill in the art having the benefit of this disclosure.

For illustration purposes, the biometric sensor used in the explanatory embodiment of FIG. 9 is a fingerprint sensor. However, as noted above, and as will be described below with reference to FIG. 13, in other embodiments the biometric sensor could be a image capture device (126) performing facial recognition or another type of biometric sensor.

The method 900 of FIG. 9 of precludes the execution, initiation, and/or performance of a authentication function assigned to a biometric sensor in accordance with one or more embodiments of the disclosure. The method 900 of FIG. 9 precludes the execution of this authentication function associated with the biometric sensor when a predefined condition is occurring concurrently with the actuation of the biometric sensor. Three examples of predefined conditions are shown in the method 900 of FIG. 9. Others will be discussed below. Still others will be obvious to those of ordinary skill in the art having the benefit of this disclosure.

Beginning at step 901, the one or more processors (112) of the electronic device 100 monitor for actuation of a fingerprint sensor (120) of the electronic device 100. In the illustrative embodiment of FIG. 9, the fingerprint sensor (120) is integrated with a touch actuator (123) configured as a physical key of the electronic device 100.

As shown at step 902, the user 600 actuates the fingerprint sensor (120) by pressing the physical key defining the touch actuator (123). At decision 903, the pre-processor (125) of the fingerprint sensor (120) detects this actuation of the fingerprint sensor (120). Since actuation occurs at step 902, the method 900 proceeds from decision 903 to step 904 of determining whether at least one predefined condition is occurring concurrently with the actuation of the fingerprint sensor (120) of the electronic device 100. Had no actuation of the fingerprint sensor (120) occurred at step 902, the method 900 would have returned from decision 903 to step 901 so that the pre-processor (125) of the fingerprint sensor (120) could continue to monitor the fingerprint sensor (120).

Step 904 comprises the pre-processor (125) of the fingerprint sensor (120) determining, optionally by using one or more sensors (119) of the electronic device 100, whether at least one predefined condition is occurring concurrently with the actuation of the fingerprint sensor (120) of the electronic device 100 occurring at step 902. Three different predefined conditions are illustrated as sub-elements of step 904. These predefined conditions could be monitored for, and detected, alone or in combination.

Decision 905 determines whether a first device housing (102) coupled to a second device housing (103) by a hinge (101) of the electronic device 100 such that the first device housing (102) is pivotable about the hinge (101) relative to the second device housing (103) between an axially displaced open position and a closed position is pivoted to the closed position. As noted above in the discussion of FIG. 1, some electronic devices are configured as hinged devices where a first device housing (102) and second device housing (103) can be pivoted to an axially displaced open position, a closed position, and partially open positions in between. Decision 905 determines whether the electronic device 100 is in the closed position.

Embodiments of the disclosure contemplate that the user 600 may become frustrated if they are holding the electronic device 100 and inadvertently actuate the fingerprint sensor (120) by touching the touch actuator (123) during the holding process. When this occurs continually, the fingerprint sensor (120) may lock out, which requires a user to enter a passcode or PIN. Accordingly, decision 905 detects whether the electronic device 100 is in the closed position, as embodiments of the disclosure contemplate that users frequently do not want to unlock their foldable devices when they are closed. This is especially true when a flexible display (121) is concealed when the first device housing (102) and second device housing (103) are in the closed position.

Accordingly, at step 909 the pre-processor (125) of the fingerprint sensor (120) of the electronic device 100 precludes the execution of the authentication function. In one or more embodiments, step 909 comprises the pre-processor (125) of the fingerprint sensor (120) discarding one or more fingerprint sensor data samples while the fingerprint sensor (120) remains operational while the electronic device 100 remains in the closed position. By contrast, when the predefined condition fails to occur concurrently with the actuation of fingerprint sensor (120), the pre-processor (125) of the fingerprint sensor (120) of the electronic device 100 allow the fingerprint sensor (120) data samples received at step 902 to be processed in response to the actuation of the fingerprint sensor (120) at step 908.

In other embodiments, step 908 can allow for the processing of fingerprint sensor data samples even when the electronic device 100 is in the closed position. In one or more embodiments, processing fingerprint sensor data samples when the electronic device 100 is in the closed position is permitted provided at least one other predefined criterion is met.

Illustrating by example, in one or more embodiments step 908 comprises processing the fingerprint sensor data samples to determine whether a source of the fingerprint sensor data samples is an authorized user of the electronic device 100 when the electronic device 100 is in the closed position and the duration during which the fingerprint sensor data samples are received is between a predefined minimum fingerprint sensor actuation duration threshold and a predefined maximum fingerprint sensor actuation duration threshold. Thus, in one or more embodiments step 908 can comprise processing the fingerprint sensor data samples to determine whether the source of the fingerprint sensor data samples is the authorized user of the electronic device when either the first device housing (102) is pivoted about the hinge (101) relative to the second device housing (103) to the axially displaced open position or, alternatively, when the first device housing (102) is pivoted about the hinge (101) relative to the second device housing (103) to the closed position and the duration within which the fingerprint sensor data samples are received is between the predefined minimum fingerprint sensor actuation duration threshold and the predefined maximum fingerprint sensor actuation duration threshold.

In one or more embodiments, the operation of steps 901-904, as well as decision 905, decision 906, and decision 907, occurs while the one or more processors (112) of the electronic device 100 are in a low-power or sleep mode, the fingerprint sensor (120) is in an active mode of operation, and the electronic device 100 is in a locked state. Where this is the case, optional step 910 can comprise waking the one or more processors (112) of the electronic device 100 when the fingerprint sensor data samples authenticate a source of the fingerprint sensor data samples, here user 600, as an authorized user of the electronic device 100. Of course, the electronic device 100 can be unlocked when the processing of the fingerprint sensor data samples successfully authenticates the source of the fingerprint sensor data samples as an authorized user of the electronic device 100.

It is possible that the authentication process will fail. Indeed, someone who is not the authorized user of the electronic device 100 may attempt to gain access to the electronic device 100 using the fingerprint sensor 120. In such situations where the fingerprint sensor data samples fail to determine that the source of the fingerprint sensor data samples is the authorized user of the electronic device, step 910 can comprise recording a wrong finger event in the pre-processor (125) of the fingerprint sensor 120, the memory (113) of the electronic device 100, at the one or more processors (112) of the electronic device 100, or combinations thereof.

Similarly, when the predefined condition determined at decision 905 is combined with other predefined conditions, e.g., whether the duration within which the fingerprint sensor data samples are received is too short or too long, as determined by decision 906, a combination of factors can lead to either unlocking the electronic device 100 when authentication is successful or recording a wrong finger event at step 910. Illustrating by example, in one or more embodiments when the fingerprint sensor data samples fail to determine the source of the fingerprint sensor data samples is the authorized user of the electronic device 100 and the duration is between the predefined minimum fingerprint sensor actuation duration threshold and the predefined maximum fingerprint sensor actuation duration threshold, step 910 can comprise recording a wrong finger event at the pre-processor (125) of the fingerprint sensor 120, the memory (113) of the electronic device 100, at the one or more processors (112) of the electronic device 100, or combinations thereof, and so forth.

What's more, the method 900 of FIG. 9 can repeat. Accordingly, in one or more embodiments after the pre-processor (125) of the fingerprint sensor (120) precludes the fingerprint sensor (120) from processing one or more fingerprint sensor data samples at step 909, the method 900 can return to step 901 where the pre-processor (125) of the fingerprint sensor (120) monitors for another actuation of the fingerprint sensor (120). Where, for example, the actuation occurring at step 902 is another actuation of the fingerprint sensor (120), at decision 903 the pre-processor (125) of the fingerprint sensor (120) can detect this second actuation of the fingerprint sensor (120). At step 904, the pre-processor (125) of the fingerprint sensor (120) can then determine whether the at least one predefined criterion is still occurring concurrently with this additional actuation of the fingerprint sensor (120).

Where the at least one predefined condition fails to still occur concurrently with this additional actuation of the fingerprint sensor (120), the pre-processor (125) of the fingerprint sensor (120) can process the new fingerprint sensor data samples received at step 902 to determine whether the source of the fingerprint sensor data samples is an authorized user of the electronic device 100 at step 908. By contrast, if the at least one predefined condition is still occurring, the pre-processor (125) of the fingerprint sensor (120) can preclude the processing of the newly received fingerprint sensor data samples at step 909.

Decision 906 determines whether the actuation of the fingerprint sensor (120) occurs for too long a time or too short a time. Illustrating by example, in one or more embodiments the at least one predefined condition determined at step 904 by decision 906 is whether the actuation of the fingerprint sensor (120) occurs for more than a predefined maximum fingerprint sensor actuation duration threshold such as three or more seconds. Similarly, the at least one prd determined at step 904 by decision 906 is whether the actuation of the fingerprint sensor (120) occurs for less than a predefined minimum fingerprint sensor actuation duration threshold such as half a second.

Accordingly, at step 909 the pre-processor (125) of the fingerprint sensor (120) of the electronic device 100 precludes the execution of the authentication function when the actuation is too long, e.g., more than three, five, or ten seconds, or is too short, e.g., less than a half, third, or quarter of a second. As before, step 909 can comprise the pre-processor (125) of the fingerprint sensor (120) discarding one or more fingerprint sensor data samples while the fingerprint sensor (120) remains operational. By contrast, when the predefined condition fails to occur concurrently with the actuation of fingerprint sensor (120), the pre-processor (125) of the fingerprint sensor (120) of the electronic device 100 allow the fingerprint sensor (120) data samples received at step 902 to be processed in response to the actuation of the fingerprint sensor (120) at step 908.

Decision 907 determines whether the actuation of the fingerprint sensor (120) occurs while the electronic device 100 is excessively moving in three-dimensional space. Embodiments of the disclosure contemplate that when a user 600 wants to unlock the electronic device 100, they generally will hold it relatively still. Accordingly, in one or more embodiments the at least one predefined condition determined at step 904 by decision 907 is whether the actuation of the fingerprint sensor (120) occurs while motion of the electronic device 100 in three-dimensional space exceeds a predefined maximum electronic device motion threshold. This can be done in a variety of ways.

As noted above in the description of the electronic device 100 with reference to FIG. 1, the one or more sensors (119) of the electronic device can include one or more motion sensors, examples if which include an accelerometer and/or gyroscope. Decision 907 can use these motion sensors to determine whether the electronic device 100 is stationary when the fingerprint sensor (120) is actuated. This can be done by either determining that a predefined number of movement measurement samples have a variation less than a predefined variation threshold. Alternatively, it can be done by determining that the electronic device 100 is stationary within three-dimensional space for at least a predefined duration.

The variation between the predefined number of movement measurement samples and/or the predefined duration when time is used can vary based upon application, desired sensitivity, or other factors. Embodiments of the disclosure contemplate that with most motion detectors, a reasonable benchmark for stability is when the one or more motion detectors determine the electronic device 100 is stationary when the electronic device 100 moves less than $1/1000^{th}$ radians from each dimension (x,y,z) of three-dimensional space during a predefined duration of 1000 milliseconds (or less). Said differently, when motion detector or motion sensor readings are almost zero, e.g., to three decimal places when the readings are in radians per second, this provides sufficient evidence to allow the fingerprint sensor data samples received at step 902 to be processed by the fingerprint sensor (120) at step 909.

While motion detectors or motion sensors making such measurements can have readings as high as four radians per second when device movement is significant, simulations indicate that when the electronic device 100 is reasonably still there is little movement in the decimal readings, with at least three decimal readings being zero. Accordingly, this amount of stability and predefined duration provide one example of values suitable for use in practice.

However, it should be noted that these values are illustrative only. It will be obvious to those of ordinary skill in the art having the benefit of this disclosure that other values, including larger or smaller movement thresholds and/or longer or shorter predefined durations can be selected based upon a desired application, motion detector, motion sensor, or other factors. Accordingly, embodiments of the disclosure are not limited by these explanatory thresholds unless positively recited in the claims below.

Accordingly, decision 907 determines whether motion of the electronic device 100 in three-dimensional space exceeds a predefined maximum electronic device motion threshold. In one or more embodiments, this can comprise determining whether a variation of a predefined number of movement measurement samples is more than a predefined variation threshold.

In one or more embodiments, decision 907 comprises detecting, from a gyroscope measuring radians per second of movement of the electronic device 100 in three dimensions, the radians per second of movement being more than a predefined movement threshold in each dimension of the three dimensions for a predefined duration. In one or more embodiments, the predefined movement threshold is $1/1000^{th}$ radians per second.

Regardless, of which method is used, decision 907 determines whether the electronic device 100 is sufficiently stationary while the user 600 actuates the fingerprint sensor (120). Accordingly, at step 909 the pre-processor (125) of the fingerprint sensor (120) of the electronic device 100 precludes the execution of the authentication function when the motion is too high, exceeding a predefined maximum electronic device motion threshold. As before, step 909 can comprise the pre-processor (125) of the fingerprint sensor (120) discarding one or more fingerprint sensor data samples while the fingerprint sensor (120) remains operational. By contrast, when the predefined condition fails to occur concurrently with the actuation of fingerprint sensor (120), the pre-processor (125) of the fingerprint sensor (120) of the electronic device 100 allow the fingerprint sensor (120) data samples received at step 902 to be processed in response to the actuation of the fingerprint sensor (120) at step 908.

The predefined condition determined by decision 905, decision 906, and decision 907 can be used alone or in combination. Illustrating by example, in the method (800) of FIG. 8 a single predefined condition, namely, whether the electronic device was in the closed position or the axially displaced open position, was the determining predefined condition that either allowed, or precluded, processing of fingerprint sensor data samples. By contrast, the methods of FIGS. 10-13 described below use combinations of predefined conditions to make this preclude/process determination to authenticate a person as an authorized user when appropriate, but to preclude false actuation of the fingerprint sensor (120) when that actuation is not desired.

Figure 10:
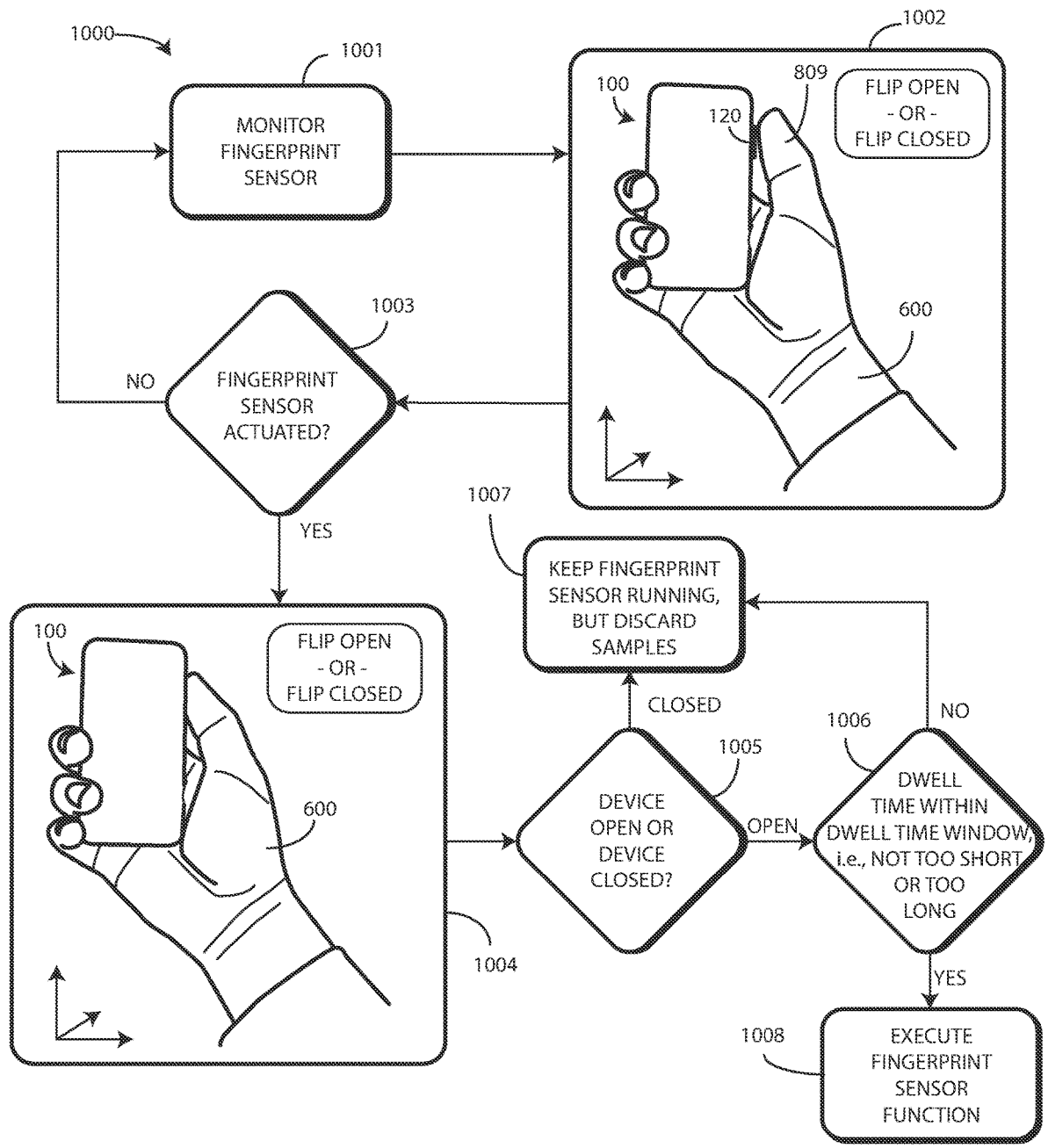
FIG. 10 illustrates still another explanatory method in accordance with one or more embodiments of the disclosure.

Beginning with FIG. 10, at step 1001 the pre-processor (125) of the fingerprint sensor 120 of the electronic device 100 monitors for actuation of the fingerprint sensor 120 of the electronic device 100. As shown at step 1002, a user 600 actuates the fingerprint sensor 120 by using a thumb 809 touching the touch actuator (123) situated on a minor face of the electronic device 100.

At decision 1003, the pre-processor (125) of the fingerprint sensor 120 of the electronic device 100 detects this actuation of the fingerprint sensor 120 by detecting a touch event occurring at the fingerprint sensor 120. Since actuation occurs at step 1002, the method 1000 proceeds from decision 1003 to step 1004 wherein fingerprint sensor data samples are captured in response to detecting the touch event. Had no actuation of the fingerprint sensor 120 occurred at step 1002, the method 1000 would have returned from decision 1003 to step 1001 so that the pre-processor (125) of the fingerprint sensor 120 could continue to monitor the fingerprint sensor 120.

As shown at step 1004, the user 600 is indeed delivering touch input to the fingerprint sensor 120. At decision 1005, the pre-processor (125) of the fingerprint sensor 120 determines whether at least one predefined condition is occurring concurrently with the actuation of the fingerprint sensor 120. In this illustrative embodiment, decision 1005 determines, using one or more sensors (119) of the electronic device 100, whether the first device housing (102) is pivoted about the hinge (101) relative to the second device housing (103) to the axially displaced open position. Decision 1006 then determines, using the pre-processor (125) of the fingerprint sensor (120), whether the fingerprint sensor data samples received at step 1004 are received during a duration that is between a predefined minimum fingerprint sensor actuation duration threshold and a predefined maximum fingerprint sensor actuation duration threshold.

Where decision 1005 determines that the first device housing (102) and second device housing (103) are pivoted to the axially displaced open position, and where decision 1006 determines that the duration within which the fingerprint sensor data samples are received is between the predefined minimum fingerprint sensor actuation duration threshold and the predefined maximum fingerprint sensor actuation duration threshold, the pre-processor (125) of the fingerprint sensor 120 process the fingerprint sensor data samples captured at step 1004 to determine whether the source of the fingerprint sensor data samples, here user 600, is an authorized user of the electronic device. Thus, while the method (800) of FIG. 8 processed the fingerprint sensor data samples to determine whether the source of the fingerprint sensor data samples was an authorized user of the electronic device when the first device housing (102) and second device housing (103) were pivoted to the axially displaced open position, the method 1000 of FIG. 10 processes those fingerprint sensor data samples at step 1008 to determine whether the source of the fingerprint sensor data samples is an authorized user of the electronic device when the first device housing (102) is pivoted about the hinge (101) relative to the second device housing (103) to the axially displaced open position and the duration during which the fingerprint sensor data samples are received is greater than the predefined minimum fingerprint sensor actuation duration threshold and less than the predefined maximum fingerprint sensor actuation duration threshold.

By contrast, at step 1007 the pre-processor (125) of the fingerprint sensor 120 precludes the fingerprint sensor 120 from processing the samples. In one or more embodiments, the pre-processor (125) of the fingerprint sensor 120 discards the fingerprint sensor data samples when the first device housing (102) and the second device housing (103) are pivoted to the closed position or, alternatively, when the first device housing (102) and the second device housing (103) are pivoted to the axially displaced open position and the duration during which the fingerprint sensor data samples are received is less than the predefined minimum fingerprint sensor actuation duration threshold or greater than the predefined maximum fingerprint sensor actuation duration threshold.

Figure 11:
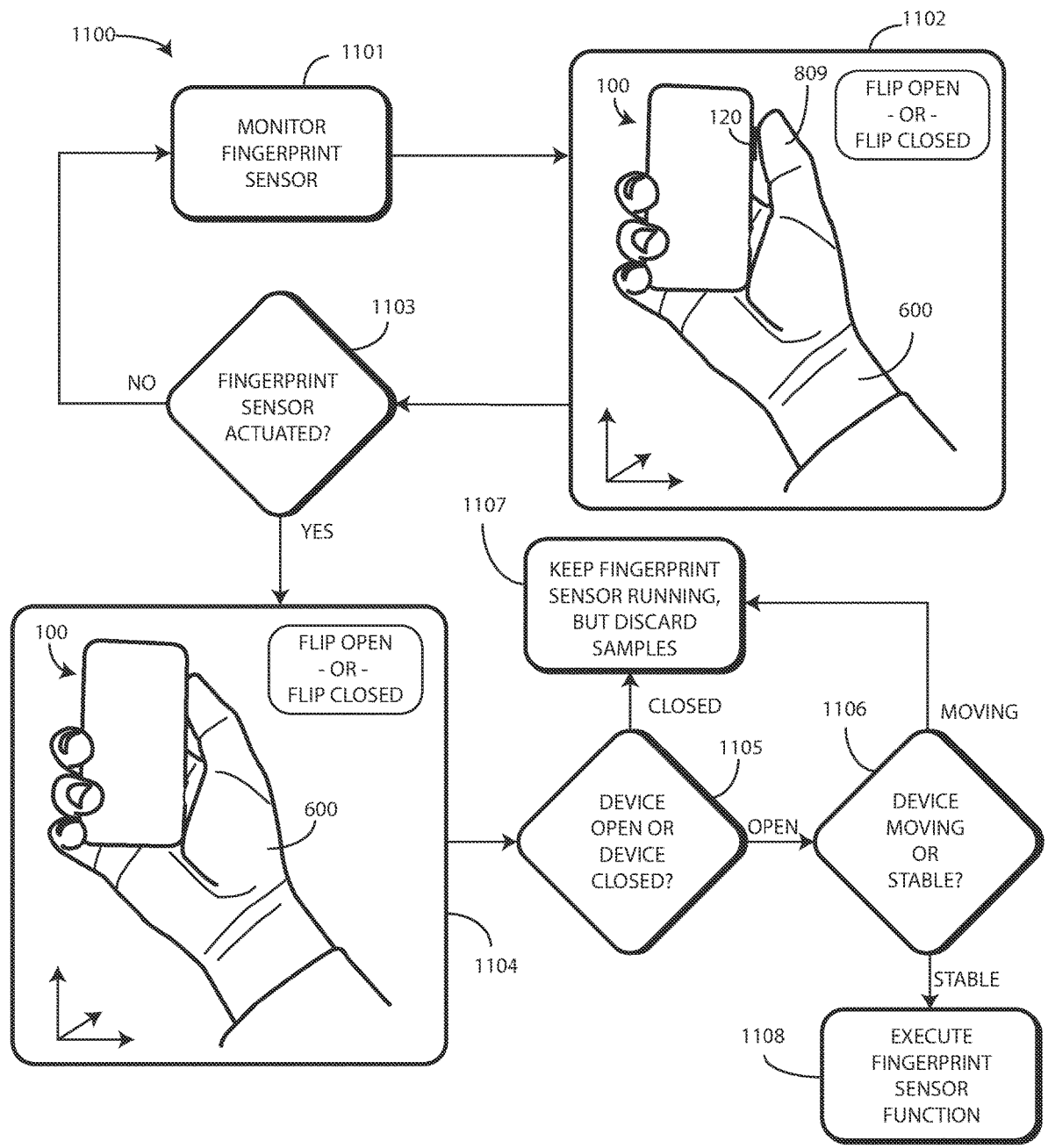
FIG. 11 illustrates yet another explanatory method in accordance with one or more embodiments of the disclosure.

Turning now to FIG. 11, at step 1101 the pre-processor (125) of the fingerprint sensor 120 of the electronic device 100 monitors for actuation of the fingerprint sensor. As shown at step 1102, a user 600 actuates the fingerprint sensor 120 by using a thumb 809 touching the touch actuator (123) situated on a minor face of the electronic device 100.

At decision 1103, the pre-processor (125) of the fingerprint sensor 120 of the electronic device 100 detects this actuation of the fingerprint sensor 120 by detecting a touch event occurring at the fingerprint sensor 120. Since actuation occurs at step 1102, the method 1100 proceeds from decision 1103 to step 1104 wherein fingerprint sensor data samples are captured in response to detecting the touch event. Had no actuation of the fingerprint sensor 120 occurred at step 1102, the method 1100 would have returned from decision 1103 to step 1101 so that the pre-processor (125) of the fingerprint sensor 120 could continue to monitor the fingerprint sensor 120.

As shown at step 1104, the user 600 is delivering touch input to the fingerprint sensor 120. At decision 1105, the pre-processor (125) of the fingerprint sensor 120 determines whether at least one predefined condition is occurring concurrently with the actuation of the fingerprint sensor 120. In this illustrative embodiment, decision 1105 determines, using one or more sensors (119) of the electronic device 100, whether the first device housing (102) is pivoted about the hinge (101) relative to the second device housing (103) to the axially displaced open position. Decision 1106 then determines, using one or more sensors (119) of the electronic device 100, whether the electronic device 100 is moving or is stable. In one or more embodiments, decision 1106 determines whether motion of the electronic device 100 is less than a predefined maximum electronic device motion threshold.

Where decision 1105 determines that the first device housing (102) and second device housing (103) are pivoted to the axially displaced open position, and where decision 1106 determines that the motion of the electronic device 100 is less than the predefined maximum electronic device motion threshold, the pre-processor (125) of the fingerprint sensor 120 process the fingerprint sensor data samples captured at step 1104 to determine whether the source of the fingerprint sensor data samples, here user 600, is an authorized user of the electronic device at step 1108.

By contrast, at step 1107 the pre-processor (125) of the fingerprint sensor 120 precludes the fingerprint sensor 120 from processing the samples. In one or more embodiments, the pre-processor (125) of the fingerprint sensor 120 discards the fingerprint sensor data samples when the first device housing (102) and the second device housing (103) are pivoted to the closed position or, alternatively, where the first device housing (102) and the second device housing (103) are pivoted to the axially displaced open position and the motion of the electronic device is greater than the predefined maximum electronic device motion threshold.

Figure 12:
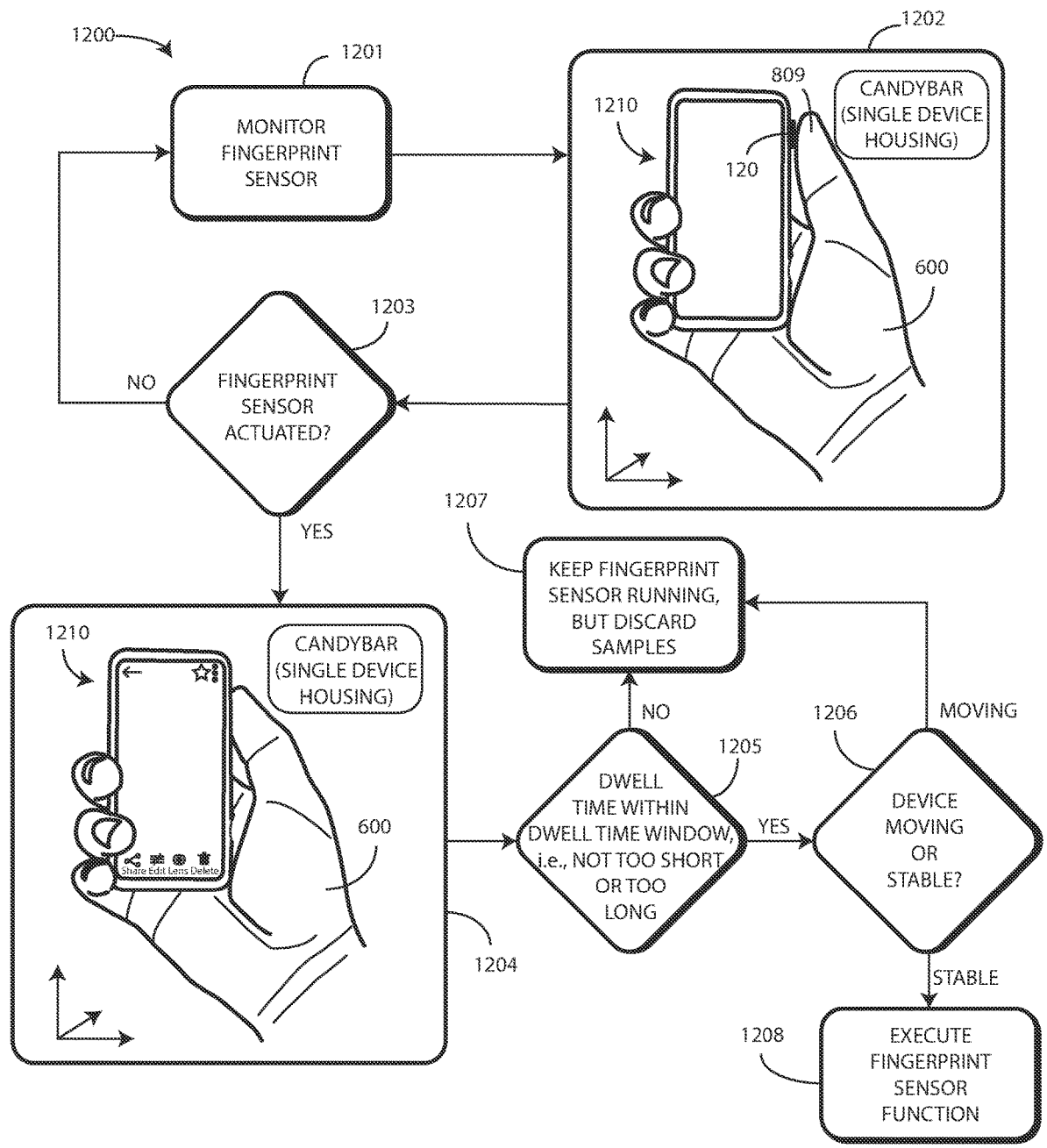
FIG. 12 illustrates another explanatory method in accordance with one or more embodiments of the disclosure.

Turning now to FIG. 12, illustrated therein is another method 1200 in accordance with one or more embodiments of the disclosure. In contrast to the method (1100) of FIG. 11 and the method (1200) of FIG. 12, which were directed to electronic devices having a first device housing (102) that is pivotable about a hinge (101) relative to a second device housing (103) between an axially displaced open position and a closed position, the electronic device 1210 of FIG. 12 is non-deformable and has a single, non-deformable device housing surrounding its display. Many of the schematic components of the electronic device (100) described above with reference to FIG. 1, such as the fingerprint sensor 120 and its pre-processor (125), can be included in the non-deformable electronic device 1210 as well.

Beginning at step 1201, a pre-processor (125) of the fingerprint sensor 120 of the electronic device 1210 monitors for actuation of the fingerprint sensor. As shown at step 1202, a user 600 actuates the fingerprint sensor 120 by using a thumb 809 touching the touch actuator situated on a minor face of the electronic device 1210.

At decision 1203, the pre-processor (125) of the fingerprint sensor 120 of the electronic device 1210 detects this actuation of the fingerprint sensor 120 by detecting a touch event occurring at the fingerprint sensor 120. Since actuation occurs at step 1202, the method 1200 proceeds from decision 1203 to step 1204 wherein fingerprint sensor data samples are captured in response to detecting the touch event. Had no actuation of the fingerprint sensor 120 occurred at step 1202, the method 1200 would have returned from decision 1203 to step 1201 so that the pre-processor (125) of the fingerprint sensor 120 could continue to monitor the fingerprint sensor 120.

As shown at step 1204, the user 600 is delivering touch input to the fingerprint sensor 120. At decision 1205, the pre-processor (125) of the fingerprint sensor 120 determines whether at least one predefined condition is occurring concurrently with the actuation of the fingerprint sensor 120. In this illustrative embodiment, decision 1205 determines whether the dwell time of the thumb 809 on the fingerprint sensor 120 was too short or too long. Specifically, in one or more embodiments decision 1205 determines whether the duration during which the fingerprint sensor data samples of step 1204 were received between a predefined minimum fingerprint sensor actuation duration threshold and a predefined maximum fingerprint sensor actuation duration threshold.

Decision 1206 then determines, using one or more sensors (119) of the electronic device 100, whether the electronic device 100 is moving or is stable. In one or more embodiments, decision 1206 determines whether motion of the electronic device 100 is less than a predefined maximum electronic device motion threshold.

Where decision 1205 determines that the fingerprint sensor data samples are received during a duration that is greater than a predefined minimum fingerprint sensor actuation duration threshold and less than a predefined maximum fingerprint sensor actuation duration threshold, and where decision 1206 determines that the motion of the electronic device 100 is less than the predefined maximum electronic device motion threshold, the pre-processor (125) of the fingerprint sensor 120 process the fingerprint sensor data samples captured at step 1204 to determine whether the source of the fingerprint sensor data samples, here user 600, is an authorized user of the electronic device at step 1208.

By contrast, at step 1207 the pre-processor (125) of the fingerprint sensor 120 precludes the fingerprint sensor 120 from processing the samples. In one or more embodiments, the pre-processor (125) of the fingerprint sensor 120 discards the fingerprint sensor data samples when the duration during which the fingerprint sensor data samples were received is less than the predefined minimum fingerprint sensor actuation duration threshold or greater than the predefined maximum fingerprint sensor actuation duration threshold and the motion of the electronic device 100 is greater than the predefined maximum electronic device motion threshold.

Figure 13:
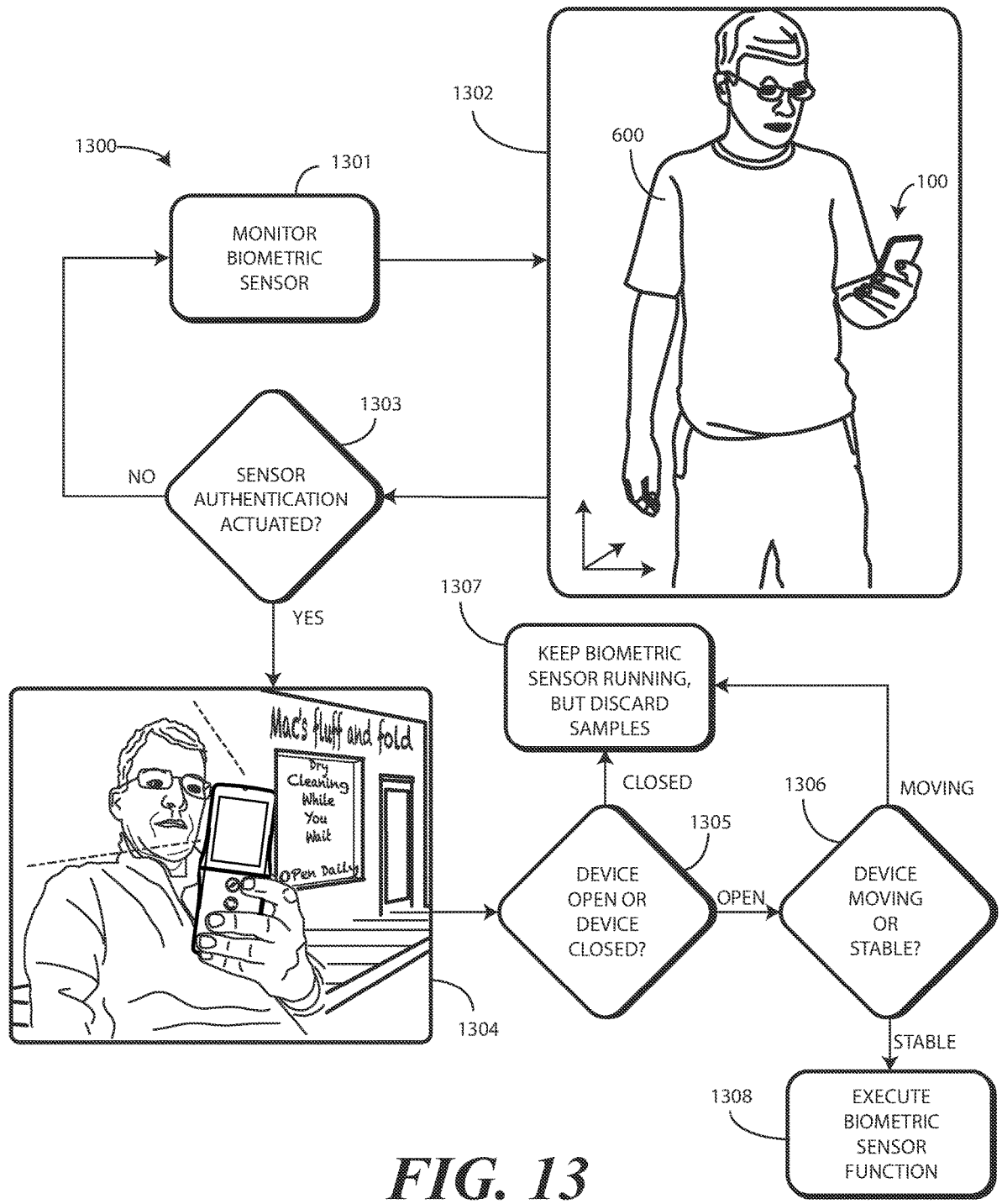
FIG. 13 illustrates another explanatory method in accordance with one or more embodiments of the disclosure.

Turning now to FIG. 13, illustrated therein is yet another method 1300 in accordance with one or more embodiments of the disclosure. To this point, many of the biometric sensors used in accordance with explanatory embodiments have been fingerprint sensors. However, as noted above, an fingerprint sensor is just one type of biometric sensor with which embodiments of the disclosure can be used. In other embodiments, a facial recognition sensor, one example of which was the image capture device (126) of the other biometric sensors (122) described above with reference to FIG. 1. In this illustrative embodiment, the image capture device (126) is carried by the second device housing (103) of an electronic device 100 having a first device housing (102) that is pivotable about a hinge (101) relative to the second device housing (103) as described above with reference to FIG. 1.

At step 1301, a pre-processor (127) operating with the image capture device (126) or one or more processors (112) of the electronic device 100 monitor for actuation of the image capture device (126) to authenticate a user 600 as an authorized user of the electronic device 100. As shown at step 1302, a user 600 initiates a facial scanning process to unlock the electronic device 100.

At decision 1303, the pre-processor (127) of image capture device (126) or the one or more processors (112) of the electronic device 100 detect this actuation of the image capture device (126). Since actuation occurs at step 1302, the method 1300 proceeds from decision 1303 to step 1304.

As noted above, the electronic device 100 can include various sensors (119). These sensors (119) can include an imager system, an audio sensor, proximity detectors, orientation sensors, a location detector, a context sensor, or other sensors. The electronic device 100 also includes one or more processors (112) that are operable with the one or more sensors (119). The method 1300 of FIG. 13 will utilize the image capture device (126) as a facial recognition sensor, although other sensors (119) could be used with the method 1300 as well.

At step 1304, the image capture device (126) captures one or more images of the user 600. In one or more embodiments, the one or more images being captured comprise still images. In other embodiments, the one or more images being captured comprise video images. In one or more embodiments, the one or more images are each a two-dimensional image. For example, in one embodiment the one or more images each comprise a two-dimensional red-green-blue (RGB) image. In another embodiment, the one or more images each comprise a two-dimensional infrared image. Other types of two-dimensional images will be obvious to those of ordinary skill in the art having the benefit of this disclosure.

In one or more embodiments, the one or more images can be compared to one or more predefined reference images stored in a memory (113) of the electronic device 100 at step 1308. By making such a comparison, a pre-processor (127) of the image capture device (126) or one or more processors (112) of the electronic device 100 can confirm whether the shape, skin tone, eye color, hair color, hair length, and other features identifiable in a two-dimensional image are that of the authorized user identified by the one or more predefined reference images.

In one or more embodiments, the pre-processor (127) of the image capture device (126) or the one or more processors (112) of the electronic device 100 compare the one or more images with the one or more predefined reference images stored in the memory (113). Authentication of the user 600 of the electronic device 100 will fail, in one or more embodiments, unless the one or more images sufficiently correspond to at least one of the one or more predefined reference images. "Sufficiently" means within a predefined threshold. For example, if one of the predefined reference images includes five hundred reference features, such as facial shape, nose shape, eye color, background image, hair color, skin color, and so forth, the one or more images will sufficiently correspond to at least one of the one or more predefined reference images when a certain number of features in the one or more images are also present in the predefined reference images. This number can be set to correspond to a level of security desired. Some users may want ninety percent of the reference features to match, while other users will be content if only eighty percent of the reference features match, and so forth.

At decision 1305, the pre-processor (127) of image capture device (126) or the one or more processors (112) of the electronic device 100 determines whether at least one predefined condition is occurring concurrently with the actuation of the image capture device (126). In this illustrative embodiment, decision 1305 determines, using one or more sensors (119) of the electronic device 100, whether the first device housing (102) is pivoted about the hinge (101) relative to the second device housing (103) to the axially displaced open position. Decision 1306 then determines, using one or more sensors (119) of the electronic device 100, whether the electronic device 100 is moving or is stable. In one or more embodiments, decision 1306 determines whether motion of the electronic device 100 is less than a predefined maximum electronic device motion threshold.

Where decision 1305 determines that the first device housing (102) and second device housing (103) are pivoted to the axially displaced open position, and where decision 1306 determines that the motion of the electronic device 100 is less than the predefined maximum electronic device motion threshold, the pre-processor (127) of image capture device (126) or the one or more processors (112) of the electronic device 100 process the one or more images by comparing them to the one or more reference images stored in the memory (113) of the electronic device 100 to determine whether the subject depicted in the one or more images, here user 600, is an authorized user of the electronic device.

By contrast, at step 1307 the pre-processor (127) of image capture device (126) or the one or more processors (112) of the electronic device 100 precludes the comparison of the one or more images to the one or more reference images, thereby precluding any processing of the one or more images. In one or more embodiments, the pre-processor (127) of image capture device (126) or the one or more processors (112) of the electronic device 100 discards the one or more images when the first device housing (102) and the second device housing (103) are pivoted to the closed position or, alternatively, where the first device housing (102) and the second device housing (103) are pivoted to the axially displaced open position and the motion of the electronic device is greater than the predefined maximum electronic device motion threshold.

Figure 14:
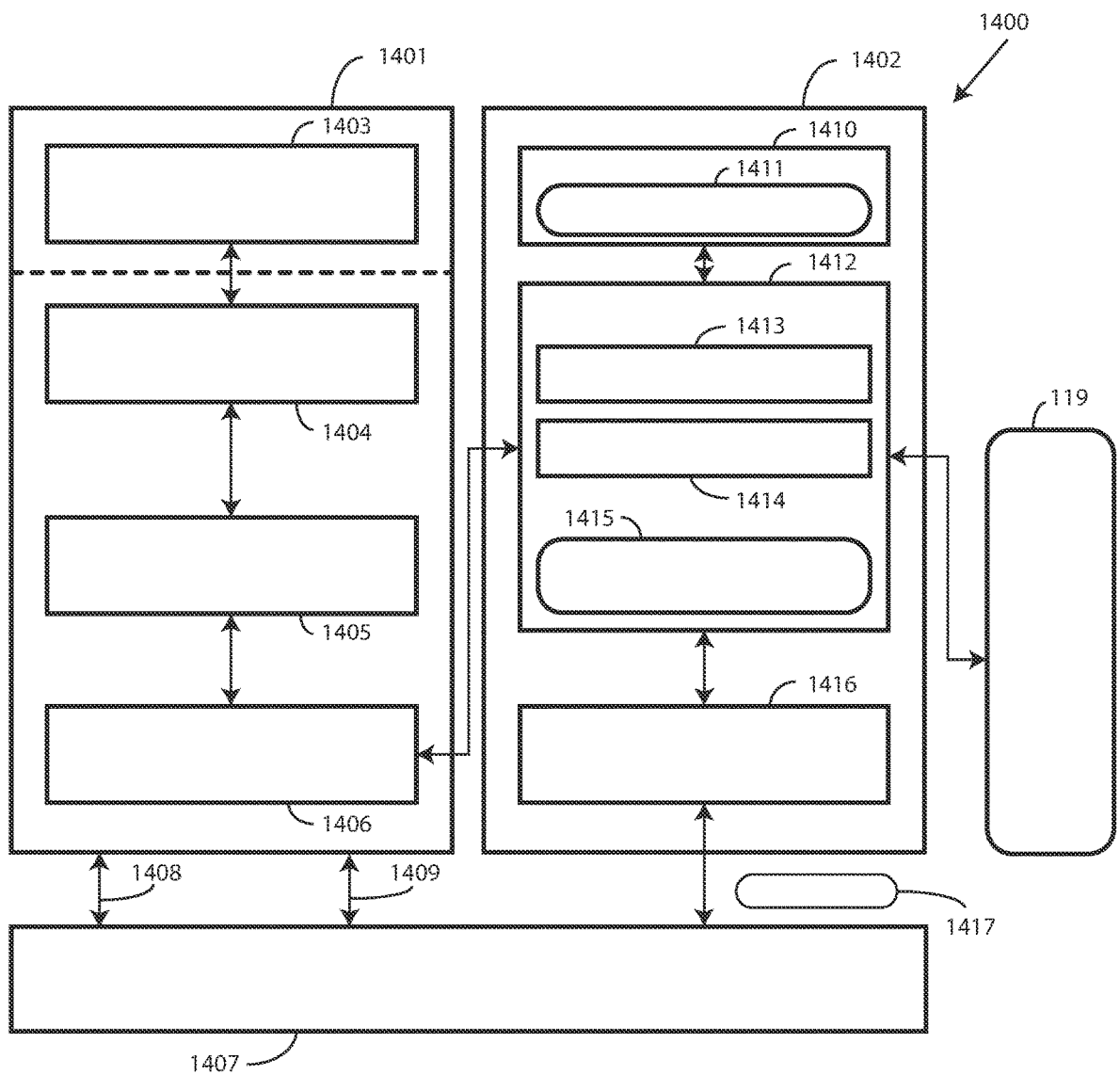
FIG. 14 illustrates one explanatory system architecture for a biometric sensor in accordance with one or more embodiments of the disclosure.

Turning now to FIG. 14, illustrated therein is a system architecture 1400 for a biometric sensor, and in particular a fingerprint sensor, configured in accordance with one or more embodiments of the disclosure. The system architecture 1400 includes several components that will be well understood by those of ordinary skill in the art having experience with fingerprint sensor technology. Illustrating by example, the system architecture includes a rich execution environment 1401, also known as a "REE," and a trusted execution environment 1402, also known as a "TEE." Within the REE are an operating system setting 1403, an IBiometricsFingerprint code set 1404 in the form of a *.so code block, a android.hardware.biometrics.fingerprint@2.1-service code block 1405, and a fingerprint sensor vendor tee client code block 1406 in the form of another *.so code block. The REE can deliver interrupt requests 1408 and/or power and reset signals 1409 to the fingerprint sensor 1407 itself.

Similarly, the TEE includes a TA entry module 1410, a fingerprint sensor software development kit 1412 that includes a fingerprint sensor image process library 1413 and a fingerprint sensor algorithm library 1414. A serial peripheral interface driver 1416 receives biometric data, one example of which are fingerprint sensor data samples 1417, from the fingerprint sensor 1407.

Embodiments of the disclosure modify these well-understood elements by allowing the system architecture 1400 to receive data from one or more sensors 119 of an electronic device. Specifically, the TA entry module 1410 is modified to include a status 1411 of the geometric configuration of the electronic device, while the fingerprint sensor image process library 1413 is modified to include a geometric configuration status check 1415. When so modified, the fingerprint sensor data samples 1417 can be discarded when the electronic device in which the system architecture is operational is in the closed position, but processed when the electronic device is in the axially displaced open position as previously described.

Figure 15:
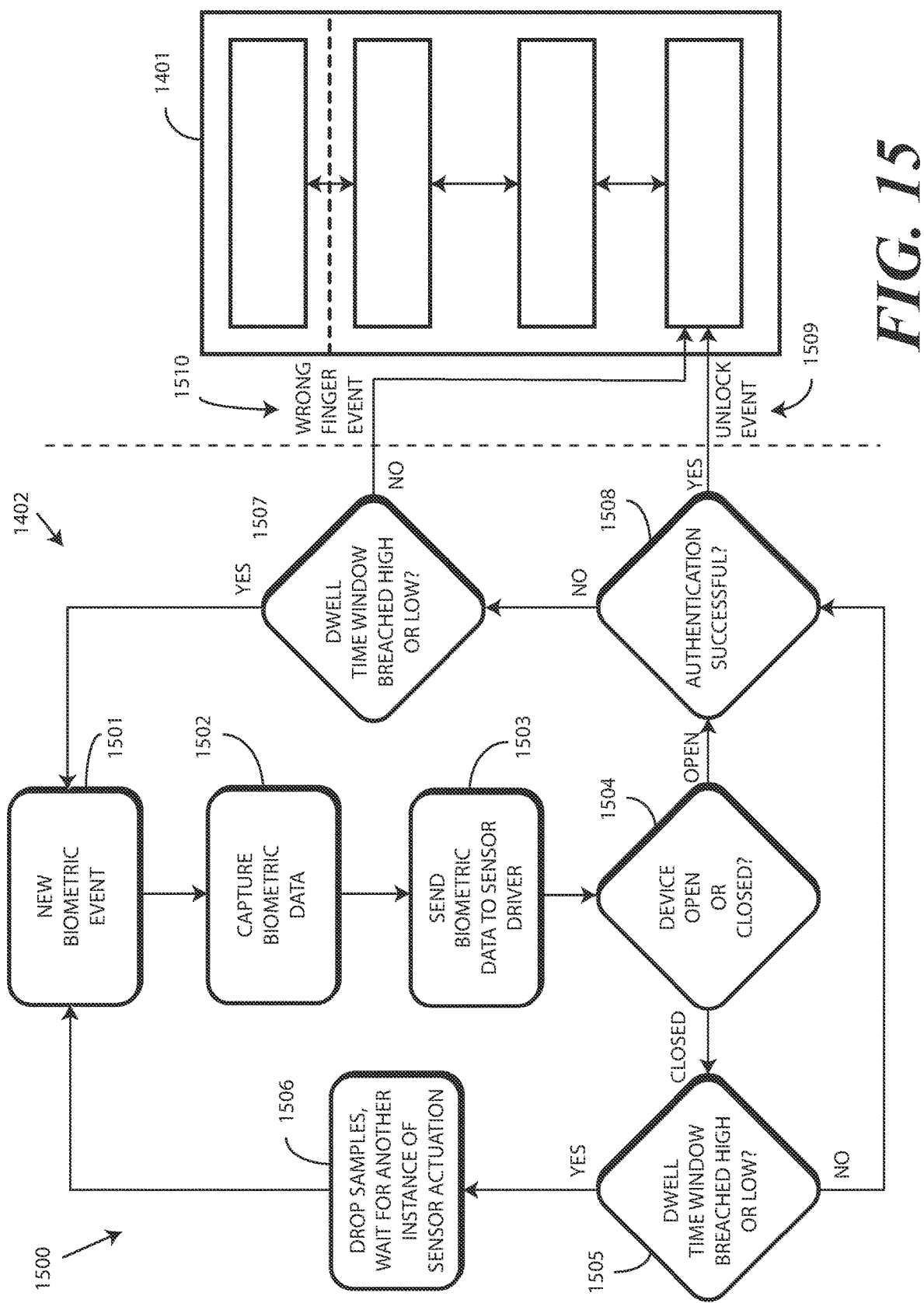
FIG. 15 illustrates one explanatory method and system in accordance with one or more embodiments of the disclosure.

Turning now to FIG. 15, illustrated therein is a method 1500 of using the system architecture (1400) of FIG. 14. The method 1500 is shown operating in the trusted execution environment 1402, while the rich execution environment 1401 is shown with the same blocks as described above with reference to FIG. 14.

At step 1501, the method 1500 detects actuation of a biometric sensor, one example of which is an fingerprint sensor. At step 1502, the method captures biometric data. For instance, step 1502 can comprise capturing one or more fingerprint sensor data samples. Step 1503 then sends those biometric data samples to the sensor driver of the TEE.

Decision 1504 determines whether the electronic device in which the system architecture (1400) is operational is in the axially displaced open position or the closed position. Where in the closed position, decision 1505 determines if the duration in which the fingerprint sensor data samples are received is less than the predefined minimum fingerprint sensor actuation duration threshold or greater than the predefined maximum fingerprint sensor actuation duration threshold. Where either is true, step 1506 discards the fingerprint sensor data samples until another biometric sensor event is detected as the method 1500 repeats at step 1501.

However, when the electronic device is in the axially displaced open position, decision 1508 determines whether the fingerprint sensor data samples authenticate a source of the fingerprint sensor data samples as an authorized user of the electronic device. Where this is the case, an unlock event 1509 can be communicated to the REE.

Otherwise, the method 1500 again determines, at decision 1507, if the duration in which the fingerprint sensor data samples are received is less than the predefined minimum fingerprint sensor actuation duration threshold or greater than the predefined maximum fingerprint sensor actuation duration threshold. Where either is true, the method 1500 returns to step 1501 to await another biometric sensor event. However, where the duration is between the predefined minimum fingerprint sensor actuation duration threshold and the predefined maximum fingerprint sensor actuation duration threshold, but the fingerprint sensor data samples fail to authenticate an authorized user of the electronic device, a wrong finger event 1510 can be delivered to the REE as shown.

Figure 16:
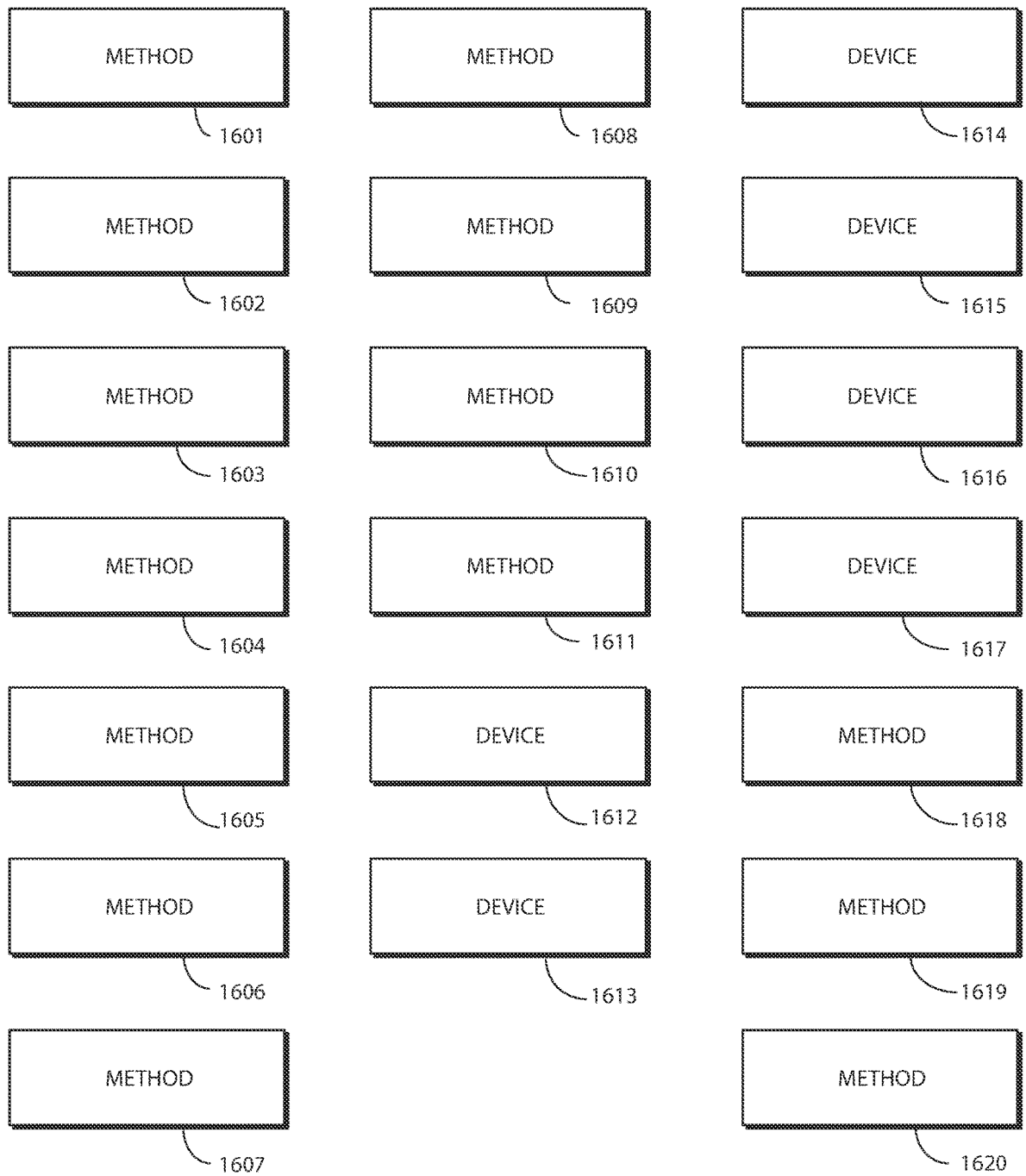
FIG. 16 illustrates various embodiments of the disclosure.

Turning now to FIG. 16, illustrated therein are various embodiments of the disclosure. The embodiments of FIG. 16 are shown as labeled boxes in FIG. 16 due to the fact that the individual components of these embodiments have been illustrated in detail in FIGS. 1-15, which precede FIG. 15. Accordingly, since these items have previously been illustrated and described, their repeated illustration is no longer essential for a proper understanding of these embodiments. Thus, the embodiments are shown as labeled boxes.

At 1601, a method in an electronic device comprises detecting, with a pre-processor of a biometric sensor, actuation of a biometric sensor of the electronic device. At 1601, the method comprises determining, by the pre-processor of the biometric sensor, whether at least one predefined condition is occurring concurrently with the actuation of the biometric sensor of the electronic device.

At 1601, when the at least one predefined condition is occurring concurrently with the actuation of the biometric sensor of the electronic device, the method comprises precluding, by the pre-processor of the biometric sensor, processing of a plurality of biometric data samples received by the biometric sensor during the actuation of the biometric sensor in response to determining the at least one predefined condition is occurring concurrently with the actuation of the biometric sensor. At 1601, the precluding occurs while allowing the biometric sensor to remain operational.

At 1602, the biometric sensor of 1601 comprises a fingerprint sensor. At 1603, the electronic device of 1602 comprises a first device housing coupled to a second device housing by a hinge such that the first device housing is pivotable about the hinge relative to the second device housing between an axially displaced open position and a closed position. At 1603, the at least one predefined condition comprises the first device housing and second device housing being pivoted to the closed position.

At 1604, the at least one predefined condition of 1603 further comprises the actuation of the fingerprint sensor occurring for less than a predefined minimum fingerprint sensor actuation duration threshold. At 1605, the at least one predefined condition of 1603 further comprises the actuation of the fingerprint sensor occurring for more than a predefined maximum fingerprint sensor actuation duration threshold. At 1606, the at least one predefined condition of 1603 further comprises motion of the electronic device in three-dimensional space exceeding a predefined maximum electronic device motion threshold.

At 1607, the method of 1603 further comprises detecting, with the pre-processor of the fingerprint sensor, another actuation of the fingerprint sensor of the electronic device. At 1607, the method of 1603 further comprises determining, by the pre-processor of the fingerprint sensor, whether the at least one predefined condition is still occurring concurrently with the other actuation of the fingerprint sensor of the electronic device. At 1607, when the at least one predefined condition fails to still occur concurrently with the other actuation of the fingerprint sensor of the electronic device, the method of 1603 comprises processing another plurality of biometric data samples received by the fingerprint sensor during the other actuation of the fingerprint sensor in response to determining the at least one predefined condition fails to still occur concurrently with the other actuation of the fingerprint sensor.

At 1608, the precluding of 1607 maintains one or more processors of the electronic device in a low-power or sleep mode of operation while the fingerprint sensor is in an active mode of operation. At 1608, the precluding of 1607 maintains the electronic device is in a locked state. At 1609, the method of 1608 further comprises waking the one or more processors of the electronic device when the processing of the another plurality of biometric data samples authenticates a source of the another plurality of biometric data samples as an authorized user of the electronic device.

At 1610, the electronic device of 1602 is non-deformable. At 1610, the at least one predefined condition of 1602 comprises motion of the electronic device in three-dimensional space exceeding a predefined maximum electronic device motion threshold and the fingerprint sensor receiving the plurality of biometric data samples for one of less than a predefined minimum fingerprint sensor actuation duration threshold or more than a predefined maximum fingerprint sensor actuation duration threshold.

At 1611, the biometric sensor of 1601 comprises a facial recognition sensor. At 1611, the electronic device of 1601 comprises a first device housing coupled to a second device housing by a hinge such that the first device housing is pivotable about the hinge relative to the second device housing between an axially displaced open position and a closed position. At 1611, the at least one predefined condition of 1601 comprises the first device housing and second device housing being pivoted to the closed position.

At 1612, an electronic device comprises a first device housing coupled to a second device housing by a hinge such that the first device housing is pivotable about the hinge relative to the second device housing between an axially displaced open position and a closed position. At 1612, the electronic device comprises a fingerprint sensor carried by one of the first device housing or the second device housing. At 1612, the fingerprint sensor comprises a pre-processor. At 1612, the pre-processor discards at least some fingerprint sensor data samples received by the fingerprint sensor when the fingerprint sensor is actuated while the first device housing and second device housing are in the closed position and at least one predefined condition is occurring.

At 1613, the at least one predefined condition of 1612 comprises the fingerprint sensor receiving the at least some fingerprint sensor data samples for one of less than a predefined minimum fingerprint sensor actuation duration threshold or more than a predefined maximum fingerprint sensor actuation duration threshold.

At 1614, the pre-processor of 1613 causes the at least some fingerprint sensor data samples to be processed to authenticate a source of the at least some fingerprint sensor data samples as an authorized user of the electronic device when the first device housing and the second device housing are either pivoted to the axially displaced open position when the at least some fingerprint sensor data samples are received or pivoted to the closed position with the at least some fingerprint sensor data samples are received during a duration that is between the predefined minimum fingerprint sensor actuation duration threshold and the predefined maximum fingerprint sensor actuation duration threshold.

At 1615, the electronic device of 1614 further comprises one or more processors. At 1615, the pre-processor discards at least some fingerprint sensor data samples received by the fingerprint sensor only when the one or more processors are in a low-power or sleep mode of operation.

At 1616, the at least one predefined condition of 1612 comprises motion of the electronic device in three-dimensional space exceeding a predefined maximum electronic device motion threshold. At 1617, the fingerprint sensor of 1612 is situated on a minor surface of the first device housing.

At 1618, a method in an electronic device comprises detecting, by a fingerprint sensor, a touch event occurring at the fingerprint sensor. At 1618, the method comprises capturing, by the fingerprint sensor, fingerprint sensor data samples in response to detecting the touch event.

At 1618, the method comprises determining, with one or more sensors of the electronic device, whether a first device housing is pivoted about a hinge relative to a second device housing to an axially displaced open position or a closed position. At 1618, the method comprises determining, with a pre-processor of the fingerprint sensor, the fingerprint sensor data samples are received during a duration that is between a predefined minimum fingerprint sensor actuation duration threshold and a predefined maximum fingerprint sensor actuation duration threshold.

At 1618, the method comprises discarding the fingerprint sensor data samples when the first device housing and the second device housing are pivoted to the closed position and the duration is either less than the predefined minimum fingerprint sensor actuation duration threshold or greater than the predefined maximum fingerprint sensor actuation duration threshold.

At 1619, the method of 1618 further comprises processing the fingerprint sensor data samples to determine whether a source of the fingerprint sensor data samples is an authorized user of the electronic device when either the first device housing is pivoted about the hinge relative to the second device housing to the axially displaced open position or the first device housing is pivoted about the hinge relative to the second device housing to the closed position and the duration is between the predefined minimum fingerprint sensor actuation duration threshold and the predefined maximum fingerprint sensor actuation duration threshold.

At 1620, the method of 1619 further comprises, when the fingerprint sensor data samples fail to determine the source of the fingerprint sensor data samples is the authorized user of the electronic device and the duration is between the predefined minimum fingerprint sensor actuation duration threshold and the predefined maximum fingerprint sensor actuation duration threshold, recording a wrong finger event at the pre-processor of the fingerprint sensor.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with a pre-processor of a biometric sensor, actuation of a biometric sensor of the electronic device;
   determining, by the pre-processor of the biometric sensor, whether at least one predefined condition is occurring concurrently with the actuation of the biometric sensor of the electronic device; and
   when the at least one predefined condition is occurring concurrently with the actuation of the biometric sensor of the electronic device, precluding, by the pre-processor of the biometric sensor, processing of a plurality of biometric data samples received by the biometric sensor during the actuation of the biometric sensor in response to determining the at least one predefined condition is occurring concurrently with the actuation of the biometric sensor while allowing the biometric sensor to remain operational;
   wherein:
   the biometric sensor comprises a fingerprint sensor;
   the electronic device comprises a first device housing coupled to a second device housing by a hinge such that the first device housing is pivotable about the hinge relative to the second device housing between an axially displaced open position and a closed position; and
   the at least one predefined condition comprises the first device housing and second device housing being pivoted to the closed position.

2. The method of claim 1, wherein the fingerprint sensor is integrated into a power button.

3. The method of claim 2, wherein the power button is positioned on a side of the electronic device.

4. The method of claim 1, wherein the at least one predefined condition further comprises the actuation of the fingerprint sensor occurring for less than a predefined minimum fingerprint sensor actuation duration threshold.

5. The method of claim 1, wherein the at least one predefined condition further comprises the actuation of the fingerprint sensor occurring for more than a predefined maximum fingerprint sensor actuation duration threshold.

6. The method of claim 1, wherein the at least one predefined condition further comprises motion of the electronic device in three-dimensional space exceeding a predefined maximum electronic device motion threshold.

7. The method of claim 1, further comprising:
   detecting, with the pre-processor of the fingerprint sensor, another actuation of the fingerprint sensor of the electronic device;
   determining, by the pre-processor of the fingerprint sensor, whether the at least one predefined condition is still occurring concurrently with the another actuation of the fingerprint sensor of the electronic device; and
   when the at least one predefined condition fails to still occur concurrently with the another actuation of the fingerprint sensor of the electronic device, processing another plurality of biometric data samples received by the fingerprint sensor during the another actuation of the fingerprint sensor in response to determining the at least one predefined condition fails to still occur concurrently with the another actuation of the fingerprint sensor.

8. The method of claim 7, wherein the precluding maintains one or more processors of the electronic device in a low-power or sleep mode of operation while:
   the fingerprint sensor is in an active mode of operation; and
   the electronic device is in a locked state.

9. The method of claim 8, further comprising waking the one or more processors of the electronic device when the processing of the another plurality of biometric data samples authenticates a source of the another plurality of biometric data samples as an authorized user of the electronic device.

10. The method of claim 1, wherein
   the at least one predefined condition further comprises:
   the fingerprint sensor receiving the plurality of biometric data samples for one of:
      less than a predefined minimum fingerprint sensor actuation duration threshold; or
      more than a predefined maximum fingerprint sensor actuation duration threshold.

11. The method of claim 1, wherein
   the at least one predefined condition further comprises the first device housing and second device housing being pivoted to the closed position.

12. An electronic device, comprising:
   a first device housing coupled to a second device housing by a hinge such that the first device housing is pivotable about the hinge relative to the second device housing between an axially displaced open position and a closed position; and
   a fingerprint sensor carried by one of the first device housing or the second device housing and comprising a pre-processor, wherein the pre-processor discards at least some fingerprint sensor data samples received by the fingerprint sensor when the fingerprint sensor is actuated while the first device housing and second device housing are in the closed position and at least one predefined condition is occurring.

13. The electronic device of claim 12, wherein the at least one predefined condition comprises the fingerprint sensor receiving the at least some fingerprint sensor data samples for one of:
   less than a predefined minimum fingerprint sensor actuation duration threshold; or
   more than a predefined maximum fingerprint sensor actuation duration threshold.

14. The electronic device of claim 13, wherein the pre-processor causes the at least some fingerprint sensor data samples to be processed to authenticate a source of the at least some fingerprint sensor data samples as an authorized user of the electronic device when the first device housing and the second device housing are either:

pivoted to the axially displaced open position when the at least some fingerprint sensor data samples are received; or pivoted to the closed position with the at least some fingerprint sensor data samples are received during a duration that is between the predefined minimum fingerprint sensor actuation duration threshold and the predefined maximum fingerprint sensor actuation duration threshold.

15. The electronic device of claim 14, further comprising one or more processors, wherein the pre-processor discards at least some fingerprint sensor data samples received by the fingerprint sensor only when the one or more processors are in a low-power or sleep mode of operation.

16. The electronic device of claim 12, wherein the at least one predefined condition comprises motion of the electronic device in three-dimensional space exceeding a predefined maximum electronic device motion threshold.

17. The electronic device of claim 12, wherein the fingerprint sensor is situated on a minor surface of the first device housing.

18. A method in an electronic device, the method comprising:

detecting, by a fingerprint sensor, a touch event occurring at the fingerprint sensor;

capturing, by the fingerprint sensor, fingerprint sensor data samples in response to detecting the touch event;

determining, with one or more sensors of the electronic device, whether a first device housing is pivoted about a hinge relative to a second device housing to an axially displaced open position or a closed position;

determining, with a pre-processor of the fingerprint sensor, the fingerprint sensor data samples are received during a duration that is between a predefined minimum fingerprint sensor actuation duration threshold and a predefined maximum fingerprint sensor actuation duration threshold; and discarding the fingerprint sensor data samples when the first device housing and the second device housing are pivoted to the closed position and the duration is either less than the predefined minimum fingerprint sensor actuation duration threshold or greater than the predefined maximum fingerprint sensor actuation duration threshold.

19. The method of claim 18, further comprising processing the fingerprint sensor data samples to determine whether a source of the fingerprint sensor data samples is an authorized user of the electronic device when either:

the first device housing is pivoted about the hinge relative to the second device housing to the axially displaced open position; or the first device housing is pivoted about the hinge relative to the second device housing to the closed position and the duration is between the predefined minimum fingerprint sensor actuation duration threshold and the predefined maximum fingerprint sensor actuation duration threshold.

20. The method of claim 19, further comprising, when the fingerprint sensor data samples fail to determine the source of the fingerprint sensor data samples is the authorized user of the electronic device and the duration is between the predefined minimum fingerprint sensor actuation duration threshold and the predefined maximum fingerprint sensor actuation duration threshold, recording a wrong finger event at the pre-processor of the fingerprint sensor.

* * * * *